United States Patent
Hu et al.

(10) Patent No.: US 10,430,708 B1
(45) Date of Patent: Oct. 1, 2019

(54) SYSTEM AND METHOD FOR NOISE-BASED TRAINING OF A PREDICTION MODEL

(71) Applicant: Aivitae LLC, Redwood City, CA (US)

(72) Inventors: Bob Sueh-chien Hu, Los Altos Hills, CA (US); Joseph Yitang Cheng, Los Altos, CA (US)

(73) Assignee: AIVITAE LLC, Redwood City, CA (US)

( * ) Notice: Subject to any disclaimer, the term of this patent is extended or adjusted under 35 U.S.C. 154(b) by 0 days.

(21) Appl. No.: 16/172,656

(22) Filed: Oct. 26, 2018

Related U.S. Application Data

(60) Provisional application No. 62/719,386, filed on Aug. 17, 2018.

(51) Int. Cl.
| | | |
|---|---|---|
| *G06K 9/00* | (2006.01) | |
| *G06N 3/08* | (2006.01) | |
| *G06T 11/00* | (2006.01) | |
| *G06T 7/00* | (2017.01) | |
| *G06T 5/00* | (2006.01) | |

(52) U.S. Cl.
CPC ............ *G06N 3/08* (2013.01); *G06T 5/002* (2013.01); *G06T 7/0012* (2013.01); *G06T 11/008* (2013.01); *G06T 2207/10012* (2013.01); *G06T 2207/10081* (2013.01); *G06T 2207/10088* (2013.01); *G06T 2207/10132* (2013.01); *G06T 2207/20081* (2013.01); *G06T 2207/20084* (2013.01)

(58) Field of Classification Search
CPC .......... G06N 3/08; G06T 5/002; G06T 7/0012
See application file for complete search history.

(56) References Cited

U.S. PATENT DOCUMENTS

| | | | |
|---|---|---|---|
| 9,710,910 B2 | | 7/2017 | Kim |
| 10,192,146 B2 * | | 1/2019 | Sen .................... G06T 5/002 |
| 2009/0187402 A1 * | | 7/2009 | Scholl ................. G10L 15/01 |
| | | | 704/233 |

(Continued)

OTHER PUBLICATIONS

Non-Final Office dated Apr. 15, 2019 in related U.S. Appl. No. 16/267,377, 8 pages.

(Continued)

*Primary Examiner* — Gregory M Desire
(74) *Attorney, Agent, or Firm* — Pillsbury Winthrop Shaw Pittman LLP

(57) ABSTRACT

In some embodiments, noise data may be used to train a neural network (or other prediction model). In some embodiments, input noise data may be obtained and provided to a prediction model to obtain an output related to the input noise data (e.g., the output being a prediction related to the input noise data). One or more target output indications may be provided as reference feedback to the prediction model to update one or more portions of the prediction model, wherein the one or more portions of the prediction model are updated based on the related output and the target indications. Subsequent to the portions of the prediction model being updated, a data item may be provided to the prediction model to obtain a prediction related to the data item (e.g., a different version of the data item, a location of an aspect in the data item, etc.).

20 Claims, 18 Drawing Sheets

(6 of 18 Drawing Sheet(s) Filed in Color)

(56) References Cited

U.S. PATENT DOCUMENTS

| | | | |
|---|---|---|---|
| 2017/0220891 A1* | 8/2017 | Kim | G06K 9/4628 |
| 2018/0144214 A1 | 5/2018 | Hsieh et al. | |
| 2018/0240219 A1* | 8/2018 | Mentl | G06T 11/008 |
| 2018/0240257 A1* | 8/2018 | Li | G06T 11/60 |
| 2018/0293710 A1* | 10/2018 | Meyer | G06T 5/002 |
| 2018/0293762 A1 | 10/2018 | Fu et al. | |
| 2018/0336471 A1* | 11/2018 | Rezagholizadeh | G06N 3/088 |
| 2018/0349759 A1* | 12/2018 | Isogawa | G06T 5/002 |
| 2018/0357753 A1* | 12/2018 | Lehtinen | G06T 5/002 |

OTHER PUBLICATIONS

Notice of Allowance dated Jun. 17, 2019 in related U.S. Appl. No. 16/267,377, 9 pages.

* cited by examiner

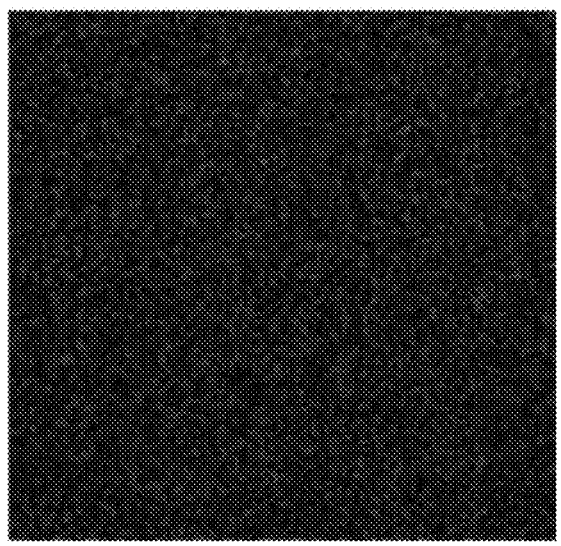
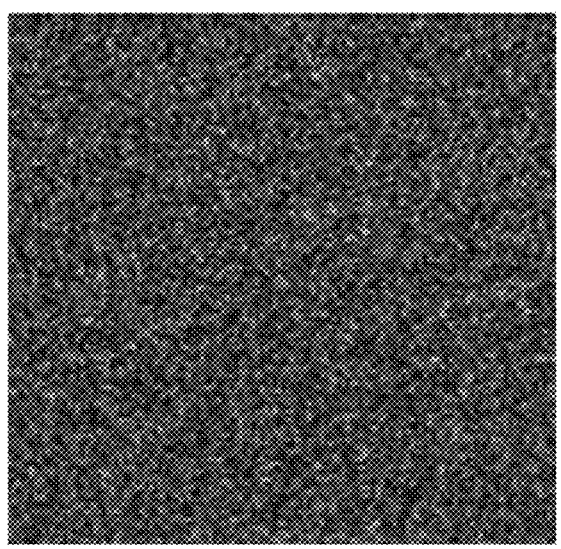
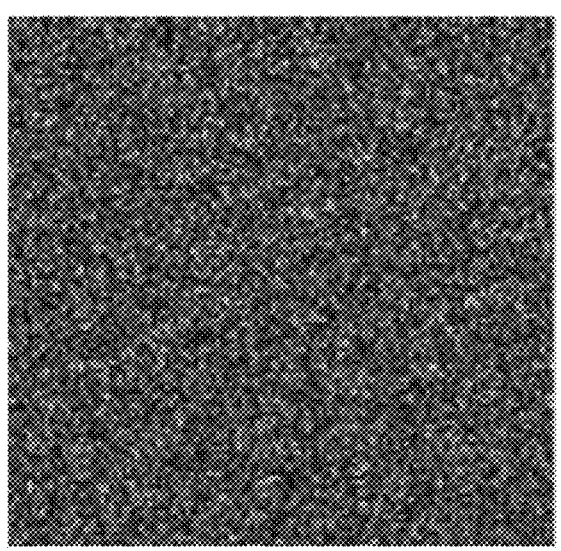
FIG. 2A

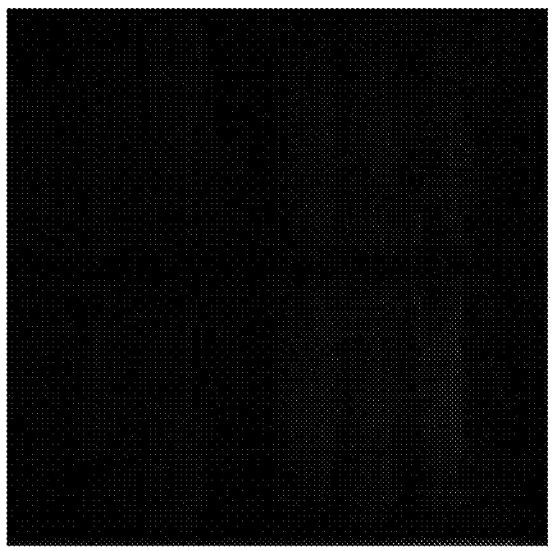
FIG. 2B

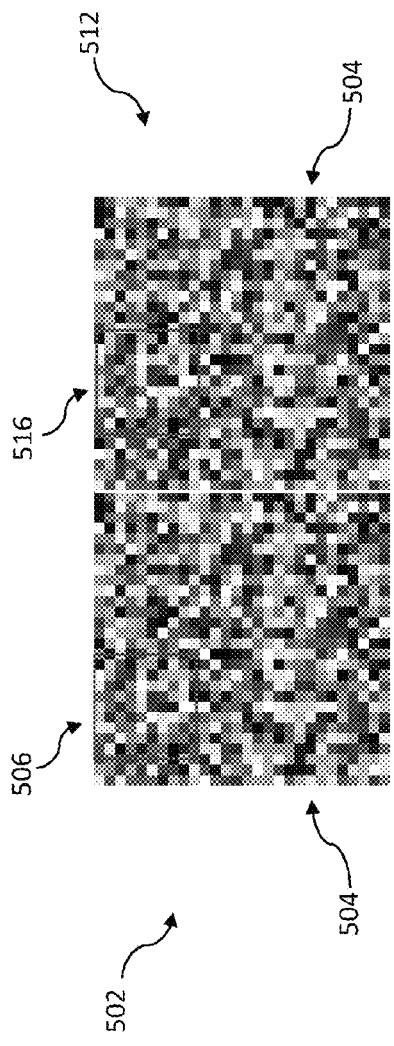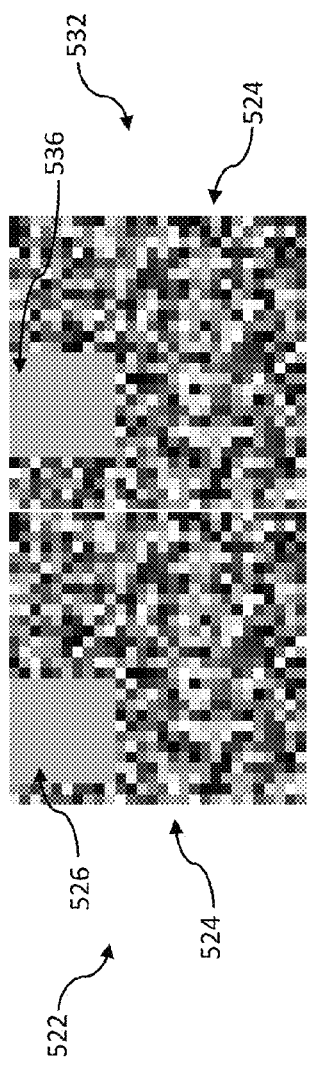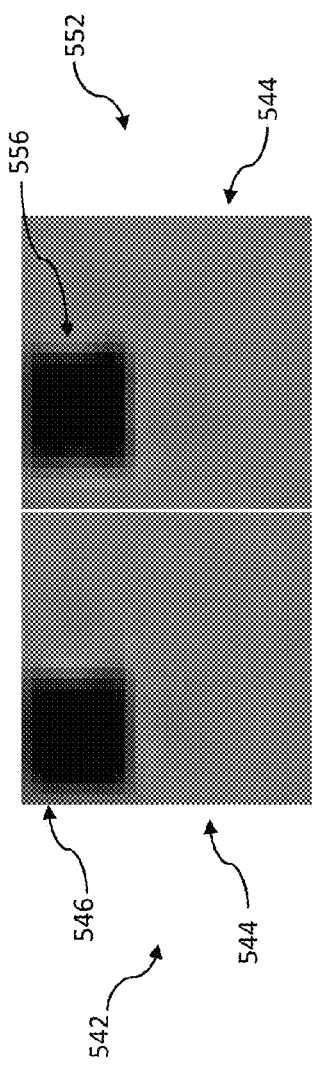

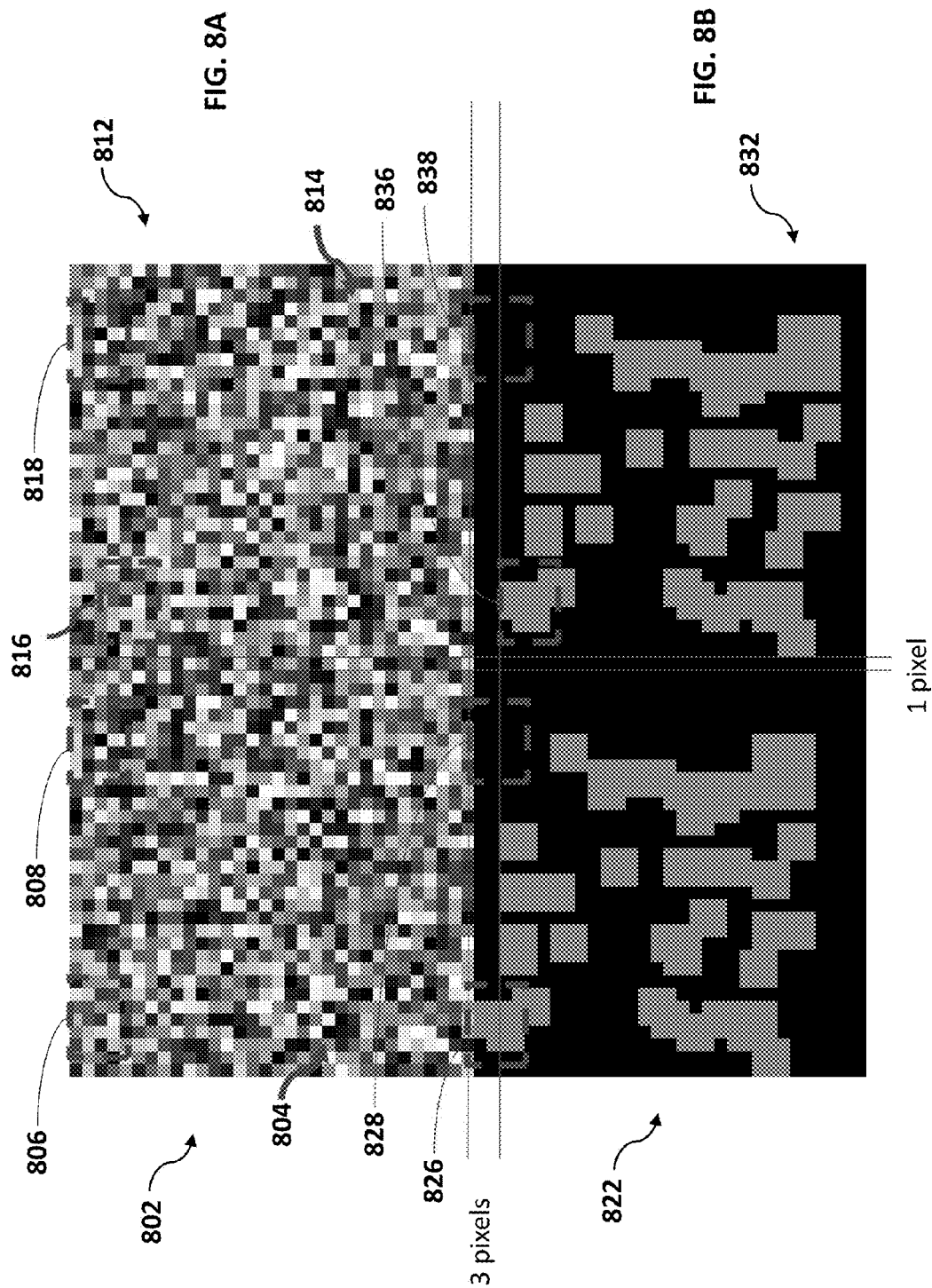

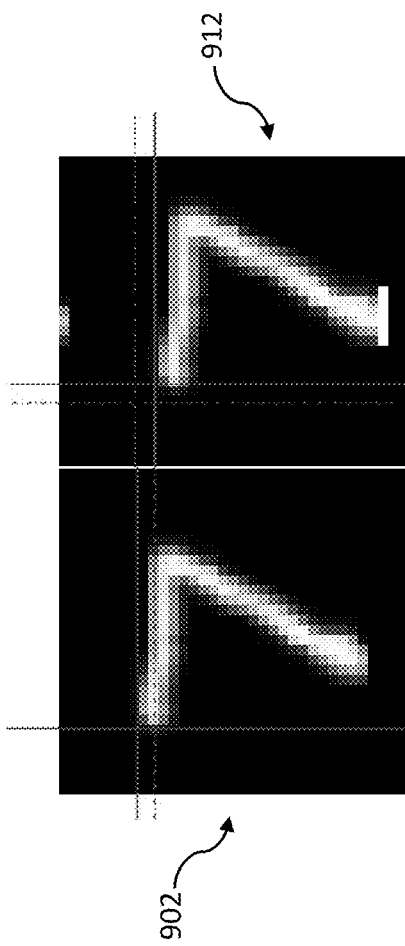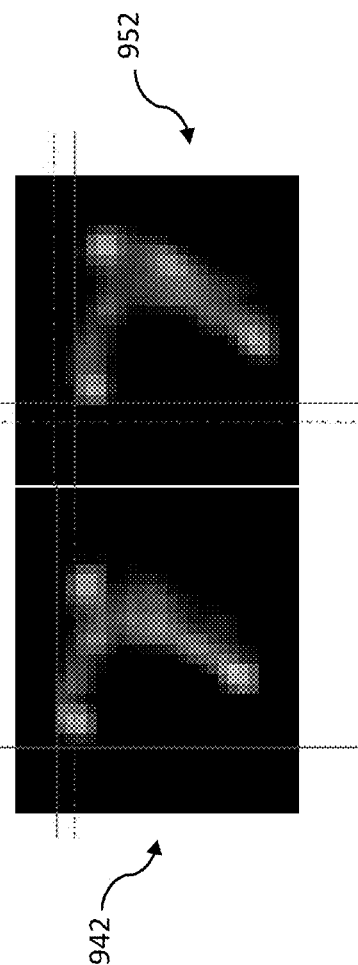
FIG. 9A
FIG. 9B

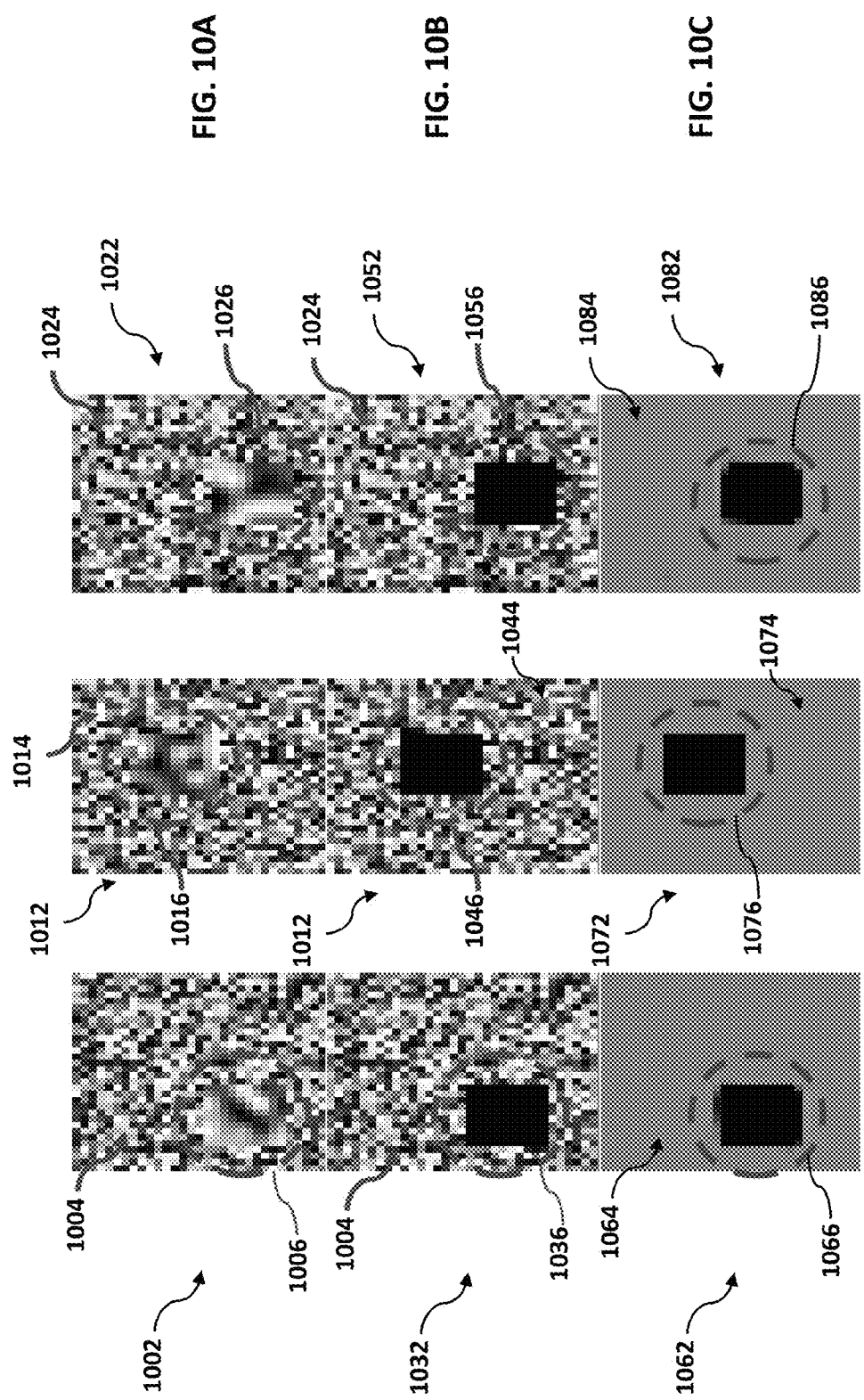

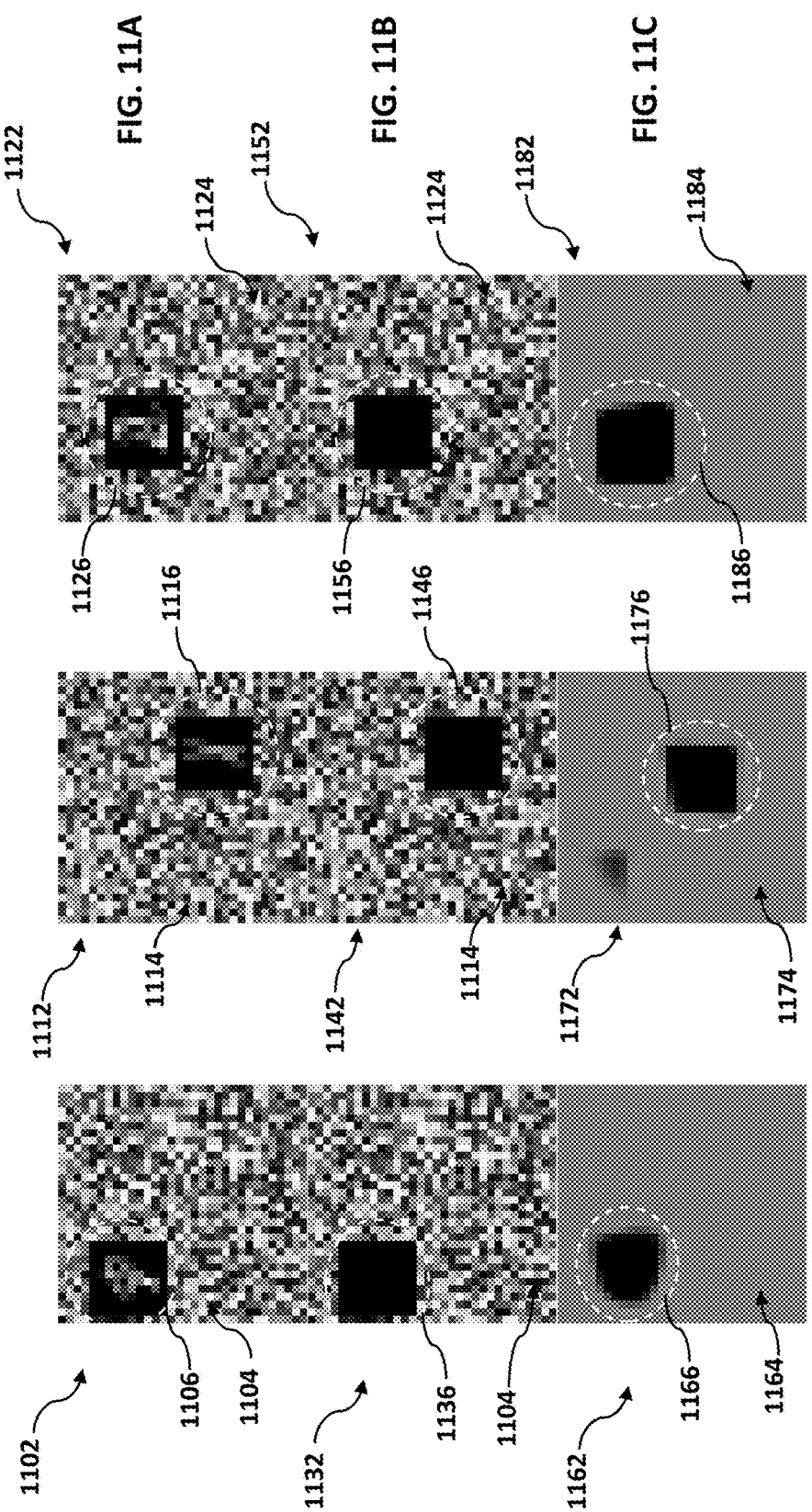

SYSTEM AND METHOD FOR NOISE-BASED TRAINING OF A PREDICTION MODEL

RELATED APPLICATIONS

This application claims the benefit of U.S. Provisional Application No. 62/719,386, filed on Aug. 17, 2018, entitled "System and Method for Enhanced Neural Network Training," which is incorporated herein by reference in its entirety.

FIELD OF THE INVENTION

This application generally relates to noise-based training of one or more prediction models, including, for example, the random generation of noise data, modification to the randomly generated noise data, and the use of such randomly generated noise data or modified version thereof to train a neural network or other prediction model.

BACKGROUND OF THE INVENTION

Typically, neural networks are trained using labeled input data that has been selected based on a particular field of interest. For example, a neural network trained to recognize human faces within images may be trained using a corpus of data including images of human faces. Additional examples include using brain scan images (e.g., Magnetic Resonance Imaging ("MRI") images) to train a neural network to detect strokes, images of particular animals to train a neural network to identify those animals within images, and using street images to train a neural network for autonomous driving.

However, the data used to train neural networks, such as those mentions above, are biased in that they only include inputs that relate to the specific desired outputs of the neural network. For example, when training a neural network to identify dogs or cats within an image, a training set of images of dogs or cats may be used. Here, the neural network is inherently biased due to the input images including the objects to be identified by the neural network. As another example, when training a neural network model to reconstruct brain scans, the neural network may be trained using a collection of selected brain scans.

Additionally, obtaining training data for a neural network can be an expensive and laborious process. For instance, labeling of data for use to train a neural network can take a long period of time and can also be inherently biased. In the case of training a neural network to reconstruct brain scans, the training data must be analyzed carefully by a skilled individual in order to properly label each brain scan. These and other drawbacks exist.

SUMMARY OF THE INVENTION

Aspects of the invention relate to methods, apparatuses, and/or systems for noise-based training of one or more neural networks or other prediction models.

The image domain corresponds to the various types of images that could possibly been viewed. When an image is captured by an image capturing device, that image capturing device is capable of viewing anything and everything. For example, a picture—which includes an array of pixels configured to different intensities—looked at from the perspective of each individual pixel, can have that pixel's intensity vary to any particular value. The entire input set of images viewable by an image capturing device therefore includes each possible variation in intensity of each pixel of an output image. Therefore, the entire input set of possible images for the image capturing device mostly includes images that look like noise (e.g., an array of pixels each having random intensity values). One of those noise images could represent an object, such as a dog or a cat. Any image can therefore be represented in its entirety by noise as noise spans the entire input set of images.

Various aspects of the invention described herein relate to training prediction models using noise. One advantage of training prediction models using noise is that the trained prediction model has improved results when subsequently input with non-noise data. Additionally, in some embodiments, training prediction models using noise avoids the need for labeling data, which not only improves the effectiveness of the prediction model, but also saves time and resources.

In some embodiments, noise data may be obtained and used as input to train one or more prediction models to generate one or more predictions. As an example, the noise data and one or more target output indications may be provided to a prediction model, where the prediction model is configured to generate an output related to the noise data, assess the related output based on the target output indications, and update one or more portions of the prediction model based on the assessment. In some embodiments, the obtainment of the noise data may involve random generation of noise or one or more other operations (e.g., modifications to create a modified version of the randomly generated noise) to generate the training data input for the prediction models.

In some embodiments, a modified version of randomly generated noise data may be provided to the prediction model to generate a reconstruction of the randomly generated noise data. The randomly generated noise data may be provided as reference feedback (e.g., as the target output indications) to the prediction model. The prediction model may assess the output based on the reference feedback and update one or more configurations of the prediction model based on the assessment. Subsequent to the configurations being updated, a data item may be provided to the prediction model, and a different version of the data item may be obtained from the prediction model. For example, a data item (e.g., an MRI scan including one or more aberrations) may be provided to the trained prediction model, and a different version of the data item (e.g., the MM scan including a reduction in the one or more aberrations) may be obtained.

In some embodiments, a first noise image and a second noise image may be obtained and provided as input to a prediction model. The first noise image may include common noise data at a first location in the first noise image, while the second noise image may include the common noise data at a second location in the second noise image. The prediction model may generate an output including information indicating predicted locations of the common noise data in the first noise image and the second noise image. One or more target output indications may be provided to the prediction model indicating the locations of the common noise data in the first noise image and the second noise image, and the prediction model may cause one or more configurations of the prediction model to be updated based on the information indicating the predicted locations and the one or more target output indications. Subsequent to the configurations being updated, a set of images may be provided to the prediction model, where each image of the image set includes common image data at different locations. Information indicating predicted locations of the common image data in each image of the set of images may be obtained from the prediction model.

In some embodiments, an image including background noise data and correlated noise data may be obtained. The image may be provided to a prediction model to generate an output including information indicating a predicted location of the correlated noise data. One or more target output indications may be provided to the prediction model, which may indicate the location of the correlated noise data in the image. Based on the target output indications and the information indicating the predicted location, one or more configurations of the prediction model may be updated. Subsequent to the configurations being updated, a subsequent image may be provided to the prediction model, and information indicating a predicted location of correlated image data in the subsequent image may be obtained.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 2A includes illustrative diagrams of noise data used for training a neural network, in accordance with various embodiments;

FIG. 2B includes illustrative diagrams of an input image and output image from a trained neural network, in accordance with various embodiments;

FIGS. 5A-C are illustrative diagrams of noise image pairs used to train a neural network to located common data, in accordance with various embodiments;

FIGS. 8A-C are illustrative diagrams of image pairs including a randomly generated set of noise blocks randomly displaced for training a neural network to segment arbitrary shapes, in accordance with various embodiments;

FIGS. 9A and 9B are illustrative diagrams of an image pair input and output from a trained neural network, in accordance with various embodiments;

FIGS. 10A-C are illustrative diagrams of a set of images including different background noise data and different correlated noise data used to train a neural network to locate correlated data, in accordance with various embodiments;

FIGS. 11A-C are illustrative diagrams of a set of images input and output from a trained neural network, in accordance with various embodiments;

DETAILED DESCRIPTION OF THE INVENTION

Figure 1A:
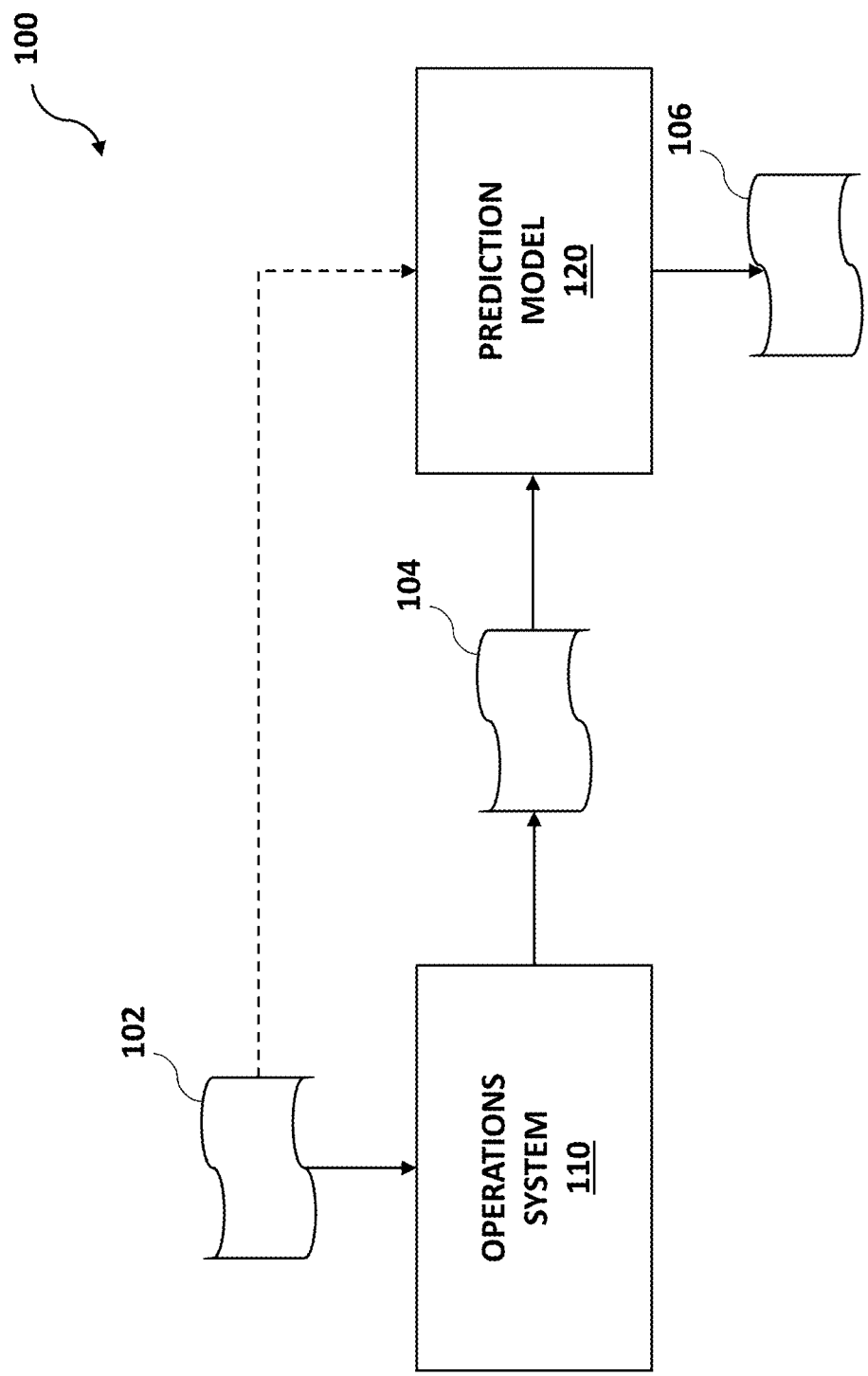
FIGS. 1A and 1B are illustrative diagrams of a system for training a prediction model, in accordance with various embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

In some embodiments, noise-based training of one or more prediction models may be facilitated. Such prediction models may include neural networks and other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibiting in their effect on an activation state of connected neural units. In some embodiments, each individual neural unit may have a summation function that combines the values of all its inputs together. In some embodiments, each connection (or the neural unit itself) may have a threshold function such that a signal must surpass the threshold before it is allowed to propagate to other neural units. These neural network systems may be self-learning and trained rather than explicitly programmed, and can perform significantly better in certain areas of problem solving as compared to traditional computer programs. In some embodiments, neural networks may include multiple layers (e.g., where a signal path traverses from front layers to back layers). In some embodiments, the neural networks may utilize back propagation techniques, where forward stimulation is used to reset weights on the "front" neural units. In some embodiments, stimulation and inhibition for neural networks may be more free-flowing, with connections interacting in a more chaotic and complex fashion Prediction models such as neural networks may suffer from a systematic bias due to data used to train the prediction models. In some embodiments, the data used to train a prediction model may be selected based on the specific application that the prediction model is directed to. For example, a prediction model to be used to identify certain neurological signatures (e.g., strokes, seizures, blood clots, etc.) may be trained using specifically selected image data of the brain (e.g., MRI scans, CT scans, etc.). By selecting image data of the brain, the prediction models may be inadvertently biased to "look" for images of the brain. However, the image spectrum includes an infinite number of possible input images, and training a prediction model on a small subset of the infinite number of possible input images may unknowingly introduce significant correlation effects that could be undesirable.

In some embodiments, noise data may be obtained and used as input to train one or more prediction models to generate one or more predictions. As an example, the noise data and one or more target output indications may be provided to a prediction model, where the prediction model is configured to generate an output related to the noise data, assess the related output based on the target output indications, and update one or more portions of the prediction model based on the assessment. In some embodiments, the obtainment of the noise data may involve random generation of noise or one or more other operations (e.g., modifications to create a modified version of the randomly generated noise) to generate the training data input for the prediction models. In some embodiments, such randomization may be a pseudo-randomization (e.g., by executing one or more RdRand instructions and applying one or more seed values or via other randomization techniques to randomly generate the noise data). In this way, not only is the collection of a large training set significantly easier to obtain (as compared to the use of traditional training sets), the use of the collection of noise training inputs to train a prediction model substantially reduces inherent biases caused by the use of traditional training sets (e.g., where the noise training set includes data items generated via random generation of noise, random placement or displacement of noise, etc.).

In some embodiments, first noise data may be provided to a prediction model to cause the prediction model to predict a reconstruction of second noise data, where one of the first noise data or the second noise data reflects a modified version of the other noise data. In addition, prior to, subsequent to, or in conjunction with providing the first noise data, the second noise data may be provided as reference feedback to the prediction model to cause the prediction model to access the predicted reconstruction (e.g., against the second noise data), where the prediction model updates its configurations (e.g., weights, biases, or other parameters) based on the assessment.

As an example, randomly generated noise data may be modified to generate a modified version of the randomly generated noise. The modified noise data may be provided to one or more prediction models to obtain a reconstruction of the randomly generated noise data. The randomly generated noise data may be provided to the prediction models to serve as reference feedback for updating one or more configurations of the prediction models. As another example, in another training scenario, the randomly generated noise data may be provided to the prediction models to obtain a reconstruction of the modified noise data, and the modified noise data may be provided to the prediction models as reference feedback for updating the configurations of the prediction models.

As an illustrative example, an MRI machine may be configured to capture MRI images at a frequency (e.g., 64 MHz). This frequency corresponds to the frequency at which the magnetic in the MM machine resonates, and is typically assumed to be uniform. However, in practice, the operating frequency may not be uniform, and instead may vary. For example, an MRI machine may have an operating frequency of 64 MHz, however, the MM machine may actually resonate at a different frequency (e.g., 65-68 MHz). The range of frequencies may be partially related to a resonant frequency associated with different biologic tissues. For example, fat tissue resonates at approximately 440 Hz off from water at 3 Torr ("T") or approximately 220 Hz at 1.5 T). The frequency range may encompass a certain amount of error as well, which are typically measured in parts-per-milligram ("ppm") with a range of approximately 0.5-3 ppm. As a result, the MRI images that are obtained may include one or more aberrations, such as distortions, vignetting, chromatic aberrations, or other aberrations. The aberrations can lead to incorrect analysis and reading of the MRI images by healthcare professionals, and ultimately misdiagnosis or failure to diagnose. Using the prediction model(s) described above, an improved MM image having a reduction or removal in aberrations may be obtained by providing the original MRI image to the trained prediction model(s) and obtaining the improved MRI image from the prediction model(s). The improved MM image may be substantially free of known processing errors, therefore allowing healthcare professionals to identify and diagnose with improved accuracy.

In some embodiments, one or more prediction models may be trained to indicate locations of common data within images. A first data item and a second data item may be obtained that each include common noise data, background noise data, or other data. As an example, the common noise data may be at a first location in the first data item, and the common noise data may be at a second location (different from the first location) in the second data item. The first data item and the second data item may both be provided to a prediction model, and information indicating predicated locations of the common noise data in each of the first data item and the second data item may be obtained. One or more target output indications may also be provided to the prediction model as reference feedback to update one or more configurations of the prediction model. The configurations may be updated based on the information indicating the predicted locations and the target output indications. As an example, the target output indications may include information indicating locations of the common noise data in each of the first data item and the second data item (e.g., a reference image indicating the location of the common noise data, information specifying pixel locations of the common noise data in the data items, etc.). In some embodiments, a collection of such pairs of data items (or other sets of such data items) may be obtained and used to train the prediction model via the foregoing techniques or other techniques described herein.

In one use case, the first data item and the second data item may be a first image and a second image, respectively. The first image and the second image may each include background noise, and the common noise data may be overlaid on the background noise at a first location in the first image and at a second location in the second image. As an example, the difference between the first location and the second location may represent an apparent motion of the common noise data from the first image to the second image (e.g., from a first time at which the first image was captured to a second time at which the second image was captured). Thus, such noise image sets may be used to train the prediction model to facilitate detection of object movement, determination of an amount of such movement, or other operations. As another example, the first image and the second image may be stereoscopic images. Stereoscopic images enable a two-dimensional image to illustrate pictorially three-dimensional space, which mimics the perceived viewing capabilities of humans. Based on the distances between a common object (e.g., represented by the common noise data during such training) in the two images, the trained prediction model may be used to predict how far the camera (or the user holding the camera) is from the common object.

In some embodiments, one or more prediction models may be trained to detect and locate correlated data within a data item (e.g., an image, audio, video, etc.). A data item may be obtained that includes background noise data and correlated noise data. As an example, where the data item is an image, the correlated noise data may represent one or more pixels that are loosely correlated to one or more adjacent pixels, whereas the background noise data represents one or more pixels that are randomly generated with respect to each adjacent pixel. The data item may be provided to a prediction model to obtain information indicating a predicated location of the correlated noise data in the data item. In addition, prior to, subsequent to, or in conjunction with providing the data item, one or more target output indications may be provided to the prediction models as reference feedback to be used to update one or more configurations of the prediction model(s). The configurations may be updated based on the information indicating the predicted locations and the target output indications. As an example, the target output indications may indicate a location of the correlated noise data in the data item (e.g., a reference image indicating the location of the correlated noise data, information specifying pixel locations of the correlated noise data in the image, etc.).

In one use case, the correlated noise data may include a texture to be learned by the prediction model. The prediction model may therefore be trained to identify whether portions of an image include correlated data (e.g., texture). In some embodiments, a plurality of images may be provided to train the prediction model. Each image of the plurality may include different background noise data and different correlated noise data. The prediction model(s) may use the plurality of images to learn texture discrimination techniques such that when an input data item having correlated data is received, the prediction model may be able to estimate a location of the correlated data within the input data item.

Figure 1B:
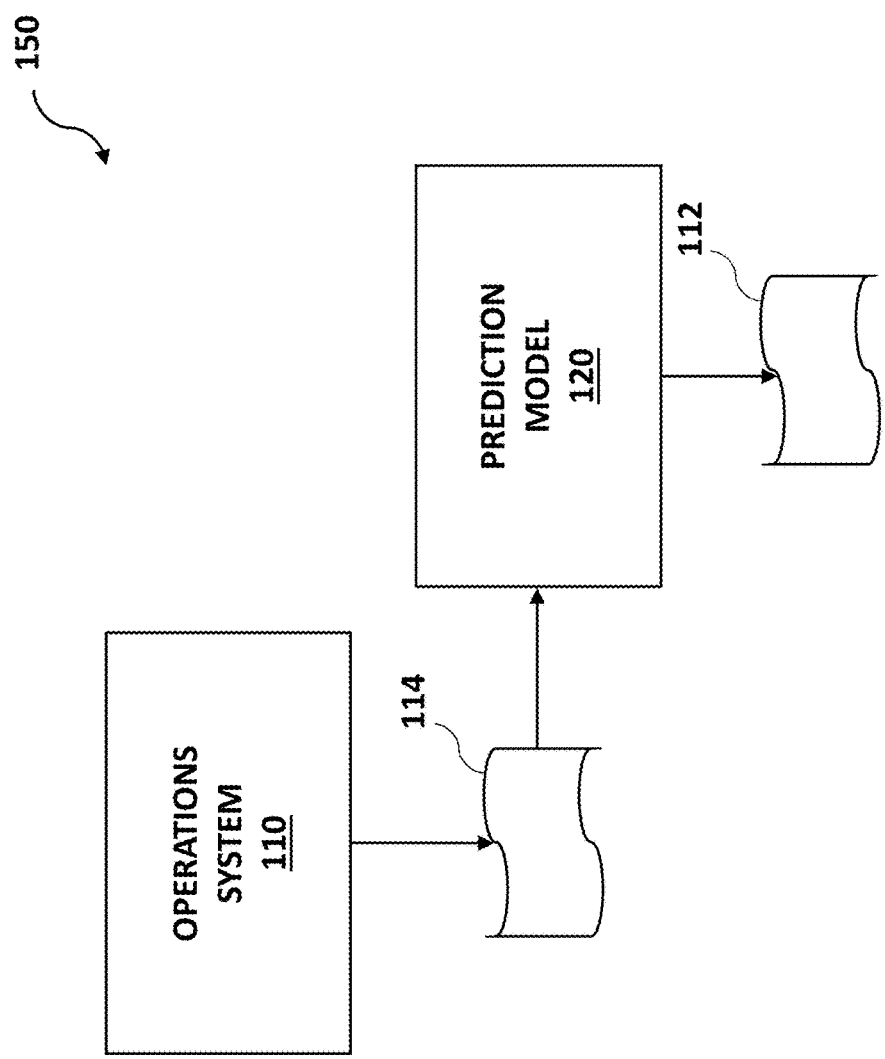

FIGS. 1A and 1B are illustrative diagrams of a system for training data prediction model, respectively, in accordance with various embodiments. FIG. 1A, in the illustrative embodiment, describes an example system 100 including an operations system 110 and a prediction model 120. Although a single instance of operations system 110 and prediction model 120 are depicted, additional operations systems and additional prediction models may be included. For example, operations system 110 may include two or more systems or devices capable of performing similar or different operations to input data. As another example, with respect to neural networks, prediction model 120 may include a single neural network or multiple neural networks, which may be linked together or may not be linked together. As described herein, prediction model 120 may include one or more gradient boosting models, Bayesian models, logistic regression models, or other prediction models. In some embodiments, prediction model 120 may include an artificial neural network ("ANN"), convolution neural network ("CNN"), Hidden Markov Models ("HMM"), a deep stacking network ("DSN"), or other neural networks.

In some embodiments, the process that is performed to the data item by operations system 110 may cause a modified version of that data item to be produced. For example, the process of operations system 110 may include an MRI process where an MRI machine generates digital representations of a biological brain that allow healthcare professionals to view, analyze, and assess the functions of the brain such as circulatory and/or neurological systems (e.g., blood flow, electrical activity of neurons). As another example, operations system 110 may include a process that performs an enhancement to a data item, such as image enhancement, audio enhance, and the like.

Operations system 110, however, may produce digital representations that include one or more aberrations. In some embodiments, the aberrations may include one or more of distortions, vignetting, and chromatic aberrations. The aberrations may lead to errors in the representations. These errors may be systematic or may vary over time, and may vary in severity. For example, the MRI process may yield an MM image of a biological brain, however, due to non-uniformity in the magnetic field of the MRI machine, the MRI machine may operate at a different resonant frequency than expected (e.g., 64±σ MHz). As a result, the images produced by the MM machine (e.g., one or more digital operations that receive input data from sensors within the MM machine and generate images that visually represent various functions of the biological brain) may include aberrations.

In some embodiments, a prediction model may be trained to identify the difference or differences caused to a data item as a result of the operations performed. However, if the training data is unknowingly biased, the prediction model may be unknowingly biased as well. For example, if the training data includes images, then the prediction model(s) may learn and remember connections between adjacent pixels. Therefore, the prediction model may be predisposed to identify connections between adjacent pixels even if there really is none. Randomly generated noise may be a universal input that has no (or few) predisposed correlations. For example, in the case of images, an image of randomly generated noise will have no correlation between adjacent pixels. Therefore, training the prediction model using randomly generated noise prevents the prediction model from being biased due to the selected training data.

In accordance with various embodiments, a prediction model may be trained using modified noise data corresponding to a modified version of randomly generated noise data. The modified noise data, as described herein, may refer to data output as a result of one or more operations being applied to randomly generated noise data. For instance, randomly generated noise data 102 may be provided to operations system 110. As a result of the operations performed to randomly generated noise data by operations system 110, modified noise data 104 may be generated and output by operations system 110. As an illustrative example, operations system 110 may be configured to perform a Fourier Transform to randomly generated noise data 102. Therefore, modified noise data 104 may be the output of a Fourier Transformation of randomly generated noise data 102.

In some embodiments, modified noise data 104 may be provided to prediction model 120 to train prediction model 120 to generate a reconstruction of randomly generated noise data 102. Modified noise data 104 may serve as training data for prediction model 120 to train the prediction model 120. As an example, prediction model 120 may be a neural network formed of a plurality of connected neural units. Based on the learned relationships between the neural units and connections, the neural network may be configured to generate a reconstruction 106 of randomly generated noise 102. Continuing the previous example corresponding to Fourier Transformations, prediction model 120 may be trained to learn a process that generates an output similar to what the inverse Fourier Transform would have produced. In other words, the training causes prediction model 120 to adjust/update its configurations (e.g., weights, biases, or other parameters) so that prediction model 120 will subsequently generate better reconstructions (e.g., if provided modified noise data 104 subsequent to such training, prediction model 120 would generate reconstructions that are more similar to randomly generated noise 102).

In some embodiments, because prediction model 120 was trained using randomly generated noise data 102, prediction model 120 may avoid learning any relationships that are unassociated with operations performed by operations system 110. Thus, after training, reconstruction 106 produced by prediction model 120 may be substantially similar to randomly generated noise data 102. As an example, a difference in pixels of an input image of noise and a reconstruction of the input image of noise after one or more operations have been performed thereto may be less than threshold value (e.g., 5% difference). A difference metric (e.g., a measure of the pixel difference) may be computed as the normalized mean square error between the reconstruction of the randomly generated noise and the randomly generated noise. In some embodiments, the difference metric may correspond to a cost function, which may be used to adjust weights associated with neural units of a neural network. As an example, the cost function may correspond to an L0, L1, or L2 vector norms. Depending the features, different cost function may be used. For example, for Fourier Transforms or other orthonormal data transformations, an L2 vector norm cost function may be used. The L2 vector norm may also be referred to as a mean square error.

In some embodiments, randomly generated noise data 102 may be provided to prediction model 120 as reference feedback, as illustrated by the dotted arrow in FIG. 1A. The reference feedback may be used to update one or more configurations of prediction model 120. For example, where prediction model 120 corresponds to a neural network, the difference between randomly generated noise data 102 and reconstruction 106 may be used to update weights between artificial neurons of prediction model 120. The updated weights may be determined using backward propagation to compute an error function indicative of an error between an input to an artificial neuron and its output. For instance, an activation of a neural unit may include a weighted sum of all the activation states of all the input neural units to the neural unit. An output from the neural unit may occur if the activation is greater than or equal to zero, allowing signal propagation through the neural unit. An error between the expected output of the neural unit and the actual output of the neural unit may be minimized using a gradient descent technique. In some embodiments, the error between randomly generated noise data 102 and reconstruction 106 may be determined, and the configurations may be updated to minimize the error. As mentioned above, the updates to the configurations may include adjusting the weights associated with one or more neural units contributing to generation of reconstruction 106.

In some embodiments, a similarity between reconstruction 106 and randomly generated noise data 102 may influence the updates caused to be performed to the configurations of prediction model 120. For instance, if prediction model 120 is capable of accurately reconstructing randomly generated noise data 102, then a difference between reference feedback 112 and reconstruction 106 should be relatively minimal. For example, if randomly generated noise data 102 corresponds to an M×N pixel array, and reconstruction 106 corresponds to an M'×N' pixel array, then assessment 160 may be calculated by computing a difference between each pixel. The difference between each pixel may depend on a number of bits associated with each pixel in a particular image (e.g., 1 bit-per-pixel ("bpp") corresponds to 2 colors, 2 bpp corresponds to 4 colors, etc.). Therefore, if a same point (e.g., coordinate (X, Y)) in two different images has a same number of bits, then the difference between that point in both reconstruction 106 and randomly generated noise data 102 would be zero.

In the illustrative embodiment of FIG. 1B, an example system 150 describes a scenario where operations system 110 outputs a data item 114. For example, operations system 110 may include an MM machine, and therefore data item 114 include an Mll image. Although no input to operations system 110 is shown within FIG. 1B, in some embodiments an input data item may be provided, and data item 114 may be an output of operations system 110 for a given input data item. For example, if operations system 110 causes a Fourier Transformation of a data item, then the data item may be input to operations system 110, and data item 114 may be the input data item having the Fourier Transformation.

Data item 114 may be provided to prediction model 120 subsequent to prediction model 120 having one or more configurations updated based on training using randomly generated noise, as described above with reference to FIG. 1A. Prediction model 120 therefore may be trained to generate a representation of data item 114 having one or more of the aberrations caused by operations system 110 reduced or otherwise minimized. Thus, in some embodiments, prediction model 120 may output a different version 112 of data item 114. For example, operations system 110 may cause image blurring. After being trained, prediction model 120 may be configured to generate output data that represents the input image having a reduction or elimination of the blurring. Different version 112 may then be provided to a client device for analysis, review, storage, and/or any other activity.

FIG. 2A includes illustrative diagrams of randomly generated noise for training a neural network, in accordance with various embodiments. For instance, FIG. 2A includes illustrative diagrams of randomly generated noise, a reconstruction of the randomly generated noise by a neural network, and a difference between the randomly generated noise and the reconstruction, respectively. In some embodiments, randomly generated noise data may be an image 202 of randomly generated noise. Image 202 may be generated using a random noise generator. In some embodiments, the random noise generator may include variable parameters such as, and without limitation, opacity, density, coloring, and dimensionality. For example, image 202 may be generated by selecting, as input parameters, a dimensionality of 100 pixels by 100 pixels (e.g., 100×100). In some embodiments, each pixel within image 202 may be randomly selected from a distribution of an input color. For example, if a black and white coloring is selected as an input parameter, then each pixel may be selected randomly having a coloring intensity between 0.0 (e.g., no coloring, white) and 1.0 (e.g., all coloring, black). Furthermore, because each pixel's coloring within image 202 is selected randomly, no correlation between adjacent pixels exist. As another example, an RGB coloring may be selected, where each color "Red," "Green," and "Blue," correspond to an 8-bit value.

Image 204 may be a reconstruction of image 202 by prediction model 120. For instance, in response to receiving image 202, operations system 110 may output a modified version of image 202 based on one or more operations performed. The modified version of image 202 may then be provided to prediction model 120, which may be configured to generate image 204 corresponding to a reconstruction of image 202. Image 204 may represent prediction model 120 attempting to "guess" what the original input image looked.

Image 206 may be a difference between image 204 and image 202. Depending on the ability of prediction model 120 to accurately reconstruct image 202, the differences between images 204 and 202 may vary. For instance, if prediction model 120 produces a very accurate reconstruction 204 of image 202, then image 206 may indicate little differences. In some embodiments, a difference between image 204 and image 202 may be determined at a pixel level. For example, each pixel within image 202 and image 204 may be compared, and a difference between the bit-per-pixel values may be calculated. Therefore, image 206 may represent a bitmask representation of the difference between each pixel. For instance, for coordinate (X1, Y1), a first pixel value from image 202 may be obtained and a second pixel value from image 204 may be obtained, each for that coordinate. An absolute value difference between the first pixel value and the second pixel value may be computed. If the difference is zero, then this may indicate that the reconstruction accurately determined the pixel value for that coordinate of image 202. If the difference is greater than zero, then this may indicate that the reconstruction did not accurately determine the pixel value. In some embodiments, a similarity score of the reconstruction may include a similarity value of image 206. For example, a similarity score may be determined by computing a summation of all of the pixel values divided by the number of pixels within image 206. Thus, if image 204 and image 202 are identical, the similarity score may be zero, or less than a threshold percentage (e.g., less than 5%).

In some embodiments, image 202 may be provided to prediction model 120 to cause one or more configurations of prediction model 120 to be updated. The configurations that are updated may be determined to adjust the ability of prediction model 120 to more accurately generate an output that conforms to the input. As an example, where prediction model 120 corresponds to a neural network, one or more weightings for neural unit activations may be adjusted so that image 204 more closely approximates image 202. If, for instance, the modified version of image 202 were provided again to prediction model 120 after the adjustments were made, then image 204 should more accurately represent image 202, and image 206 would represent less non-zero bits. In this example, the similarity score of the revised comparison image 206 should less than 5%, indicating that the two images are identical. However, in some embodiments, a collection of randomly generated noise images may be provided to operations system 110, and the modified versions output from operations system 110 may then be provided to prediction model 120. Therefore, prediction model 120 may be trained using a plurality of training images so as to avoid using a same input image more than one time. In some embodiments, after one or more configurations of prediction model 120 have been updated, prediction model 120 may be considered trained. Subsequent to the training, data items may be provided to prediction model 120, as illustrated in FIG. 2B.

FIG. 2B includes illustrative diagrams of an input image and output image from a trained neural network, in accordance with various embodiments. For instance, FIG. 2B includes illustrative diagrams of an image output from a medical imaging device, a different version of the image generated by a trained neural network, and a difference between the medical image and the different version, respectively. In some embodiments, image 252 may be an MRI image output by an MM machine. As mentioned previously, MRI machines may be configured to operate at a resonant frequency of 64 MHz, however due to non-uniformity in the magnetic field, the actual operating frequency may differ from 64 MHz. Therefore, image 252 may include one or more aberrations that can detract from an overall quality of the image. Additionally, a patient having an MM procedure may move while in the MRI machine. Movement by a patient may also contribute to aberrations within image 252. In some embodiments, image 252 may be provided to prediction model 120. Prediction model 120, prior to receiving image 252, may have one or more configurations updated based on reconstruction 106 and randomly generated noise data 102, the latter of which may serve as reference feedback for prediction model 120. Image 252 may therefore be provided to prediction model 120, which has been trained using randomly generated noise data.

In some embodiments, prediction model 120 may be configured to output image 254. Image 254 may represent image 252 having a reduction to the aberrations present within image 252. Trained prediction model 120 may therefore allow increased detail to be viewable within image 254. In the illustrated example, the increased detail of MRI image 254 may allow a healthcare professional to more easily identify abnormalities within a patient's MRI image, improving the healthcare professional's ability to diagnose medical ailments, and subsequently improving a patient's health.

In some embodiments, image 256 may represent a difference between image 254 and image 252. For example, a difference in pixel value for each pixel within images 252 and 254 may be computed. Larger differences between pixel values may be represented by less darkened pixels within image 256, while smaller differences between pixel values may be represented by darker pixels within image 256.

Figure 3:
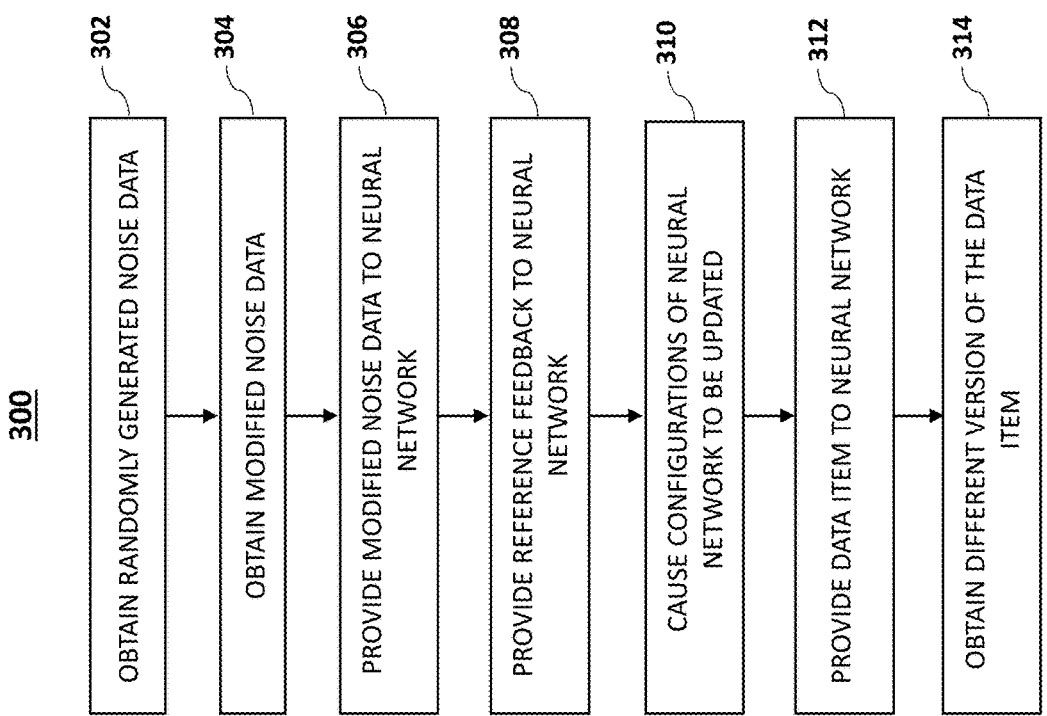
FIG. 3 is an illustrative flowchart of a process for noise-based training a neural network, in accordance with various embodiments.

FIG. 3 is an illustrative flowchart of a process for training a neural network using randomly generated noise, in accordance with various embodiments. In some embodiments, process 300 may begin at step 302. At step 302, randomly generated noise data may be obtained. The randomly generated noise data may be obtained by one or more systems capable of performing one or more operations to the randomly generated noise data. For example, operations system 110 may obtain randomly generated noise data 102. In some embodiments, a random noise generator may generate the randomly generated noise data. The random noise generator may provide the randomly generated noise data to operation system 110. Alternatively, operations system 110 may be configured to generate the randomly generated noise data. In still further embodiments, the randomly generated noise data may be pre-generated and stored in a database. In this scenario, operations system 110 may be configured to access the database and retrieve the randomly generated noise data. The randomly generated noise data may include an audible representation of noise (e.g., random collection of audible frequencies) and/or a visual representation of noise (e.g., random array of colors and intensities). Furthermore, in some embodiments, the randomly generated noise data may include a collection of audible noise or noise images.

At step 304, modified noise data corresponding to a modified version of the randomly generated noise data may be obtained. In some embodiments, the modified noise data may be obtained by modifying the randomly generated noise data to generate the modified noise data. As mentioned above, the randomly generated noise data (e.g., randomly generated noise data 102) may be obtained by operations system 110. Operations system 110 may be configured to perform one or more operations to input data. In some embodiments, performance of the operations to the input data may cause the input data to be modified. For example, medical imaging may result in one or more aberrations being included within medical image. In some embodiments, the modified noise data may be an output of a transformation of the randomly generated noise data. As another example, a process configured to perform Fourier Transforms to an input image may cause one or more aberrations to be included within the transformed image. Therefore, the modified version of the input image may be slightly different from the original image prior to application of the medical imaging processes. In other embodiments, the operations system may be configured to receive the modified noise data from an external system, device, and/or database.

Generally speaking, the modified version of the randomly generated noise data may still be randomly generated noise, albeit the organization of the noise data may be modified in a particular manner. Returning to the example of medical imaging, the output image from the medical imaging processes may still visually represent a medical image (e.g., an MM scan), however aberrations, such as blurring or other distortions, may now exist. The true image (e.g., the image without any aberrations or with a reduction to the aberrations), however, may not be readily available.

At step 306, the modified noise data may be provided to a neural network. For example, modified noise data 104 may be provided to prediction model 120. The neural network may be configured to generate a reconstruction of the randomly generated noise data based on the modified noise data and the randomly generated noise data. For example, prediction model 120 may generate reconstruction 106 of randomly generated noise data 102. As mentioned previously, the neural network may learn a transformative process that inverts each individual datum from the modified noise data to the randomly generated noise data. In other words, the neural network may learn how to achieve a given output based on a given input. For example, prediction model 120 may be configured to learn how to generate reconstruction 106 based on an input of modified noise data 104. This may allow an unmodified data item to be generated in response to providing an input data item representing some modification to the unmodified data item to the neural network. Here, the modification of the unmodified data item may be due to a computational process performed thereto.

At step 308, a reference feedback may be provided to the neural network. For example, randomly generated noise data 102 may be provided to prediction model 120 as reference feedback. Using the reference feedback, the neural network may be configured to determine one or more configurations to be updated. In some embodiments, prediction model 120 may assess reconstruction 106 based on the reference feedback. Based on the reference feedback and the reconstruction, prediction model 120 may determine one or more configurations to be updated. In some embodiments, where prediction model 120 corresponds to a neural network, the configurations to be updated may reflect adjustments to weights associated with neural units within a neural network. The adjustment to the weights may affect whether threshold function associated with a neural unit activates for a given input. For example, before configurations are updated, a neural unit may have a first weight that, responsive to receipt of an input signal, causes that neural unit to activate. After the configurations are updated, however, the same input signal may no longer cause that neural unit to activate, and thus the input signal may not propagate to other connected neural units.

At step 310, the configurations of the neural network may be caused to be updated. In some embodiments, one or more configurations of prediction model 120 may be caused to be updated based on randomly generated noise data 102 serving as reference feedback and reconstruction 106. For example, where prediction model 120 corresponds to a neural network, the neural network may update one or more neural unit thresholds, neural unit connections, and/or neural unit parameters to adjust how each neural unit processes signals. The updates to the neural network configurations may serve to refine and improve the learning process so that subsequent inputs to the neural network yield outputs that are more accurate.

At step 312, a data item may be provided to the neural network subsequent to the neural network configurations being updated. For example, a processed image (e.g., an MRI image output by an MRI machine) may be provided to prediction model 120. As another example, an image output by a Fourier Transform process may be provided to prediction model 120. In some embodiments, the processed image may include one or more aberrations. For example, data item 114 may include one or more aberrations caused by operations system 110. In some embodiments, the data item may include one of an MRI scan, an ultrasound image, a computed tomography ("CT") scan image, an audio file, an image, and a video file.

At step 314, a different version of the data item may be obtained. For example, different version 112 of data item 114 may be obtained from prediction model 120. In some embodiments, the different version 112 may be a version of a data item input having the aberrations minimized. For example, the different version may be image 254 of FIG. 2B that is obtained in response to image 252 being provided to prediction model 120. In some embodiments, the data item provided to prediction model 120 may be a modified version of a given data item. In this scenario, the different version of the data item output by prediction model 120 may be a reconstruction of the given data item. For example, the data item may be an MRI image including one or more aberrations, and the different version of the MM image may not include the aberrations.

Figure 4B:
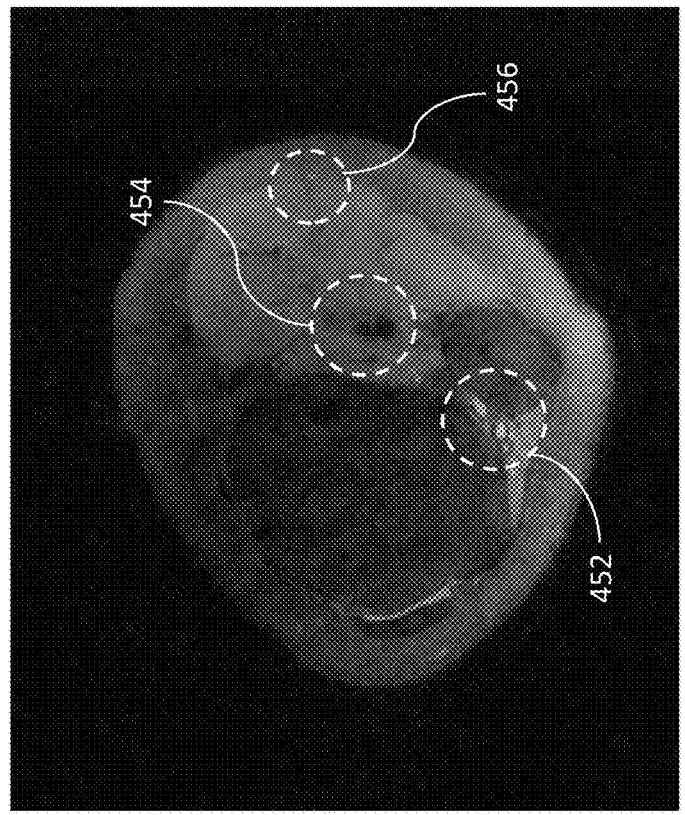
FIGS. 4A and 4B are illustrative diagrams of an MRI image and a version of the MM image output by a trained neural network, respectively, in accordance with various embodiments.
Figure 4A:
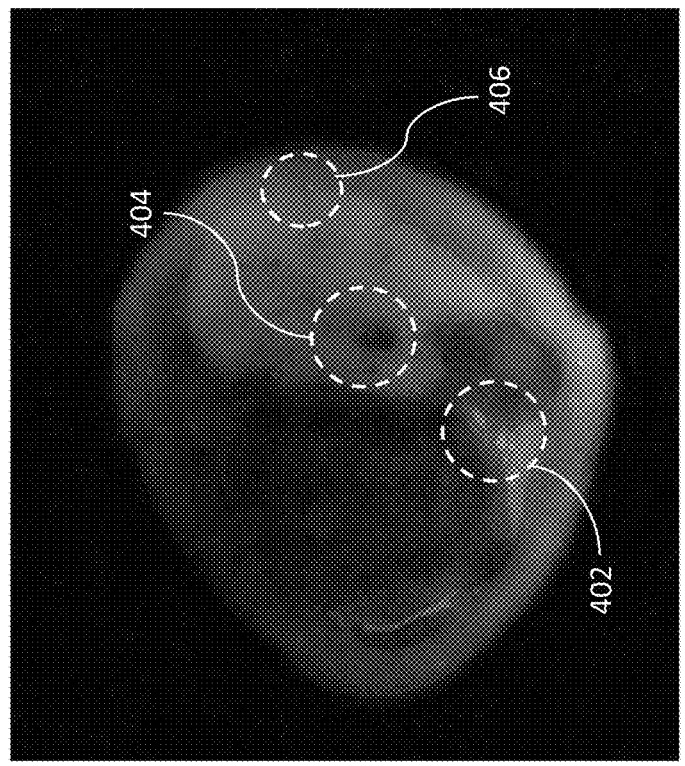

FIGS. 4A and 4B are illustrative diagrams of an MM image and a version of the MM image output by a trained neural network, respectively, in accordance with various embodiments. For instance, FIGS. 4A and 4B are illustrative diagrams of an MRI image output from an MM machine including one or more aberrations, and a different version of the MRI image output by a trained neural network with a reduction in the aberrations, respectively. MRI image 400 of FIG. 4A includes one or more regions where aberrations are visible. MM image 450 of FIG. 4B include the same one or more regions, however, the aberrations have been reduced.

MRI image 400 may include a first aberration region 402, a second aberration region 404, and a third aberration region 406. In each of regions 402, 404, and 406, the resolution of corresponding structures imaged has poor quality. For example, structures included within region 402 appear out of focus. As another example, the structure within region 404 does not appear to have clear boundaries. As yet another example, in region 406, no structure can be clearly seen.

MRI image 450 may include a first aberration region 452, a second aberration region 454, and a third aberration region 456. Regions 452-456 may correspond to similar locations within image 450 as compared to regions 402-406 of image 400. However, regions 452-456 may depict structures with increased clarity, improved resolution, and reduced distortion. For example, as seen within region 452, the two structures that appeared out of focus in region 402 now are clearly present with improved focus. Additional structures also not viewable within region 402 are now viewable within region 452. As another example, region 454 depicts a structure having clear boundaries, whereas the boundaries of the same structure in region 404 were unclear. Further still, region 456 illustrates the presence of a structure not previously seen within region 406.

As seen from the improved image 450, training prediction model 120 using randomly generated noise may allow data to be obtained that has aberration reduction. In the example of medical images, a reduction in the aberrations present within an image may allow for increased clarity. By doing so, a medical professional may improve his/her ability to analyze and diagnose medical conditions, thereby improving a patient's health.

FIGS. 5A-C are illustrative diagrams of noise image pairs used to train a neural network to located common data, in accordance with various embodiments. In some embodiments, FIGS. 5A-C include illustrative diagrams of image pairs including a first image having a background noise and common noise at a first location and a second image having the background noise and the common noise at a second location, the first image having a placeholder for the common noise at the first location and the second image having a placeholder for the common noise at a second location, the region of noise removed from each image, and images including information about a predicated location of the common noise in the first image and the second image, respectively. In FIG. 5A, a pair of data items is described including a first noise data 502 and a second noise data 512. First noise data 502 may include randomly generated noise data 504, and second noise data 512 may also include randomly generated noise data 504. For example, randomly generated noise data 504 and randomly generated noise data 514 may be common background image data. In some embodiments, randomly generated noise data 504 may differ between noise data 502 and 512. First noise data 502 may also include common noise data 506 at a first location and second noise data 512 may also include common noise data 516 at a second location. Common noise data 506 and 516 may be similar in appearance but may differ in location with respect to each data item.

In some embodiments, first noise data 502 may be a first image, and second noise data 512 may be a second image. The first image and the second image may include a common background noise image. The common noise data may be located at a first location within the first image and at a second location within the second image. For example, the common noise data may represent a block of pixels representing noise that is overlaid on a background corresponding to a noise image. In the first image, the block of pixels may occupy X pixels along a first axis, and Y pixels along a second axis, and may have a center point associated with a pixel coordinate (X1, Y1). In the second image, the block of pixels may also occupy X pixels along the first axis and Y pixels along the second axis, however, the center point may now be associated with pixel coordinate (X2, Y2). Therefore, the block of pixels associated with common noise data 516 may be shifted along the first axis (X2-X1) pixels and shifted (Y2-Y1) pixels along the second axis with respect to common noise data 506.

Noise data 502 and 512 may be used to train prediction model 120 to detect apparent motion. For example, noise data 502 and 512 may be stereoscopic images that form an illusion of three-dimensional ("3D") imagery using two two-dimensional ("2D") images. Noise data 502 and 512 may be provided to a neural network to obtain information indicating predicted locations of common noise data 506 and 516, respectively. In some embodiments, noise data 502 may be data item 102 of FIG. 1A, while data item 504 may be noise data 104 of FIG. 1A. For instance, noise data 504 may be a modified version of noise data 502. However, both noise data 502 and 504 are provided to prediction model 120 as inputs to train prediction model 120.

In some embodiments, more than two images (e.g., three or more images) or two or more pairs of images may be input to prediction model 120 to detect apparent motion. For example, stereoscopic vision and video tracking may employ more than a pair of images, and therefore more than a pair of noise images (e.g., noise data 502 and 512) may be used. Vertical discrimination may be obtainable in a scenario where more than two images are used as inputs. Video discrimination and tracking may also be improved by using more than two temporal images to achieve improved segmentation. For example, two pairs of images, one captured at time T1 and one captured at time T2, may be used by prediction model 120 to better track motion for video segmentation. In some embodiments, if the image pairs corresponded to 3D spatial-temporal objects, improved prediction may be achieved, as an increased number of temporal frames may be obtained and used to analyze and predict the location of the common data.

In FIG. 5B, noise data including first noise data 522 and second noise data 532 is described. First noise data 522 may include randomly generated noise data 524, and second noise data 532 may also include randomly generated noise data 524. In some embodiments, randomly generated noise data 524 and randomly generated noise data 504 may be the same. For example, randomly generated noise data 504 and randomly generated noise data 524 may both be common background image data. First noise data 522 may also include a first placeholder 526 for common noise data 506 at the first location and a second placeholder for common noise data 516 at the second location. Placeholders 526 and 536 may be similar in appearance. For example, placeholders 526 and 536 may be a uniform image, such as a gray box. In some embodiments, noise data 522 and 532 may be used as location labels for prediction model 120 when being trained to determine estimated locations of common noise data 506 and 516 within noise data 502 and 512, respectively. In some embodiments, placeholders 526 and 536 may be generated by removing common noise data 506 and 516 from each of noise data 502 and 512 to indicate the first and second locations, respectively.

In some embodiments, first noise data 522 may be a first image, and second noise data 532 may be a second image. The first image and the second image may include placeholders 526 and 536, respectively, each indicating a location of the common noise data as seen within noise data 502 and 512, respectively. The placeholders may also represent a block of pixels representing noise that is overlaid on a background corresponding to a noise image. Thus, similar to the above description, placeholders 526 and 536 may both include a block of pixels occupying X pixels along a first axis, and Y pixels along a second axis. However, a center point of placeholder 526 may be associated with a pixel coordinate (X1, Y1), while a center point of placeholder 536 may be associated with pixel coordinate (X2, Y2). Therefore, placeholder 536 may be shifted along the first axis (X2-X1) pixels and shifted (Y2-Y1) pixels along the second axis with respect to placeholder 526.

In FIG. 5C, a pair of data items is described including a first data item 542 and a second data item 552. First data item 542 may include information indicating a predicted location 546 of common noise data 506 as determined by prediction model 120, while second data item 552 may include information indicating a predicted location 556 of common noise data 516 as determined by prediction model 120. In some embodiments, first data item 542 and second data item 552 may include images including the information indicating the predicted locations of common noise data 506 and common noise data 516, respectively. Each of data items 542 and 552 may include background data 544.

Prediction model 120 may output data items 542 and 552 in response to noise data 502 and 512 being input. For instance, reconstruction 106 of FIG. 1A may include data items 542 and 552. Prediction model 120 generate the location information that indicates the predicted locations of the common noise data of the input data items. In some embodiments, prediction model 120 identifies the apparent motion of common noise data 506 and 516 to determine the information indicating predicted locations 546 and 556, respectively.

In some embodiments, one or more target output indications may be provided to the neural network as reference feedback. For instance, noise data 502 and 512 may be provided to prediction model 120 as reference feedback for updating one or more configurations of prediction model 120. The configurations may be updated based on the information determined by prediction model 120 that indicates the predicted locations 546 and 556 of common noise data 506 and 516, respectively, as well as based on the target output indications. In some embodiments, the target output indications may include information indicating locations of common noise data 506 and 516 in noise data 502 and 512, respectively. For example, the configurations of prediction model 120 may be updated based on data items 502 and 512, in addition to noise data 546 and 556.

In some embodiments, noise data 522 and 532 may also be provided to prediction model 120, and the configurations of prediction model 120 may be updated based on noise data 522 and 532. Noise data 522 and 532 may serve as location labels noise data 502 and 512, where placeholders 526 and 536 are used as labels indicative of the locations of common noise data 506 and 516 in noise data 502 and 512, respectively.

In some embodiments, noise data 502 and 512 may be generated by obtaining randomly generated noise data and common noise data. First noise data 502 may be generated based on randomly generated noise data 504 and common noise data 506. Second noise data 512 may be generated based on randomly generated noise data 504 and common noise data 516. In some embodiments, first noise data 502 may be generated by incorporating common noise data 506 as a foreground object at the first location over randomly generated noise data 504 as a background. Second noise data 512 may be generated by incorporating common noise data 516 as a foreground object at a random location over randomly generated noise data 504 as a background. In some embodiments, the random location where common noise data 516 is incorporated may include the second location.

Figure 5D:
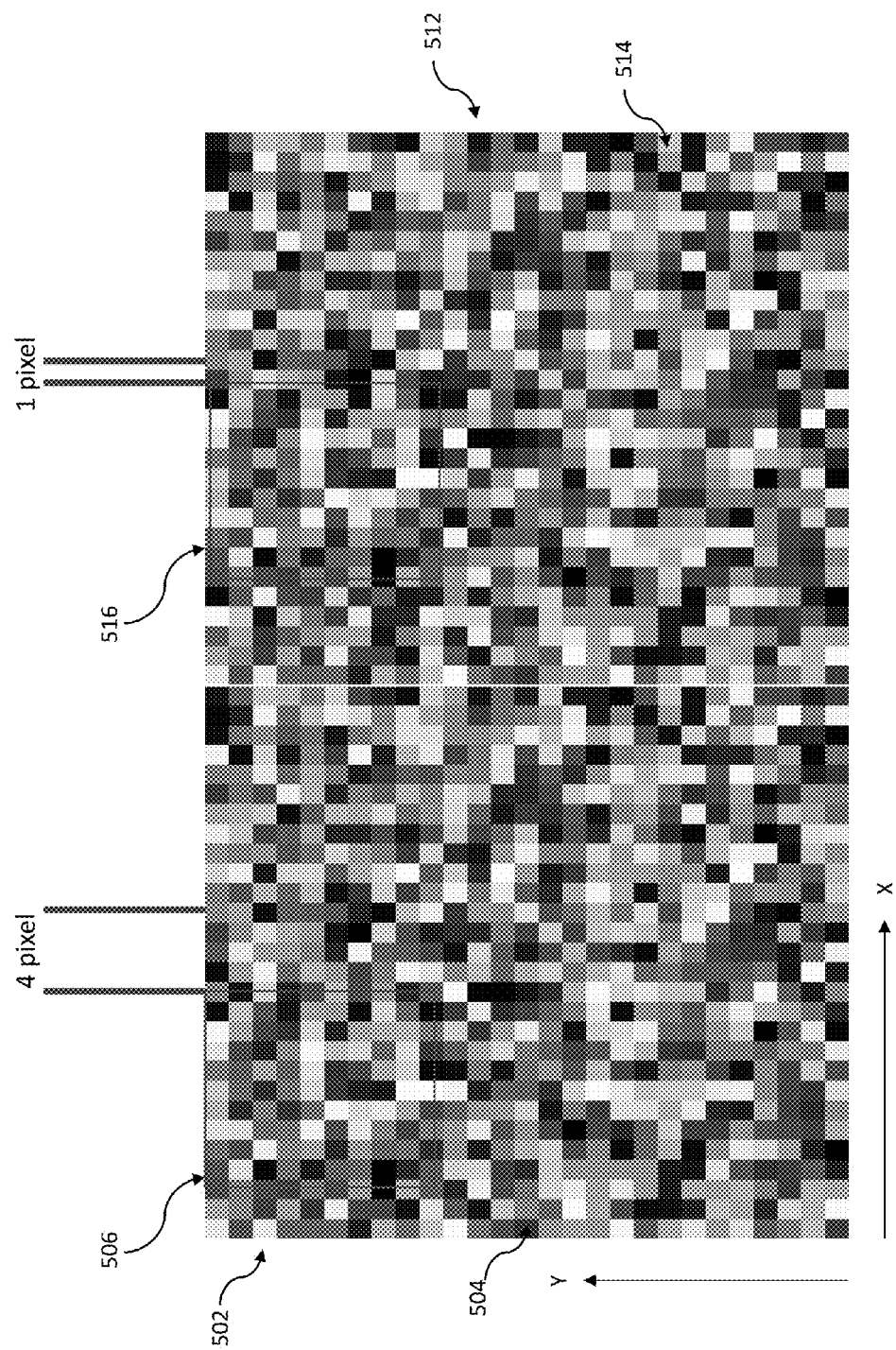
FIG. 5D is an illustrative diagram of an enlarged version of the image pair of FIG. 5A, in accordance with various embodiments.

FIG. 5D is an illustrative diagram of an enlarged version of the image pair of FIG. 5A, in accordance with various embodiments. As seen in FIG. 5D, common noise data 516 may be shifted along a first axis (e.g., "X"-axis) as compared to common noise data 506. No shift along a second axis (e.g., "Y"-axis) may be illustrated, however, this is merely exemplary. In some embodiments, shifting common noise data 506 three pixels in the positive X direction may cause three pixels of background noise data 514 to appear in noise data 512 that was not visible within noise data 502. Additionally, by shifting common noise data 506 three pixels in the positive X direction, three pixels of background noise data 504 visible within noise data 502 may no longer be visible within noise data 512. The difference in location of common noise data 506 in noise data 502 as compared to common noise data 516 in noise data 512 may illustrate the 3D stereoscopic imagery that prediction model 120 may be trained to recognize.

Figure 6A:
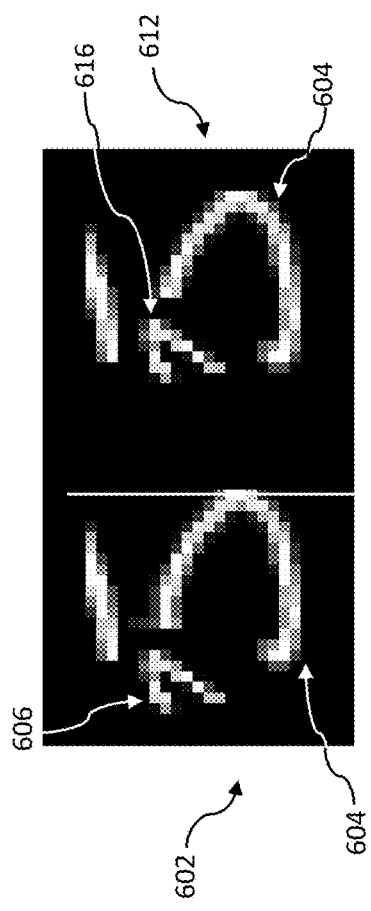
FIGS. 6A-C are illustrative diagrams of an image pair input and output from a trained neural network, in accordance with various embodiments.
Figure 6B:
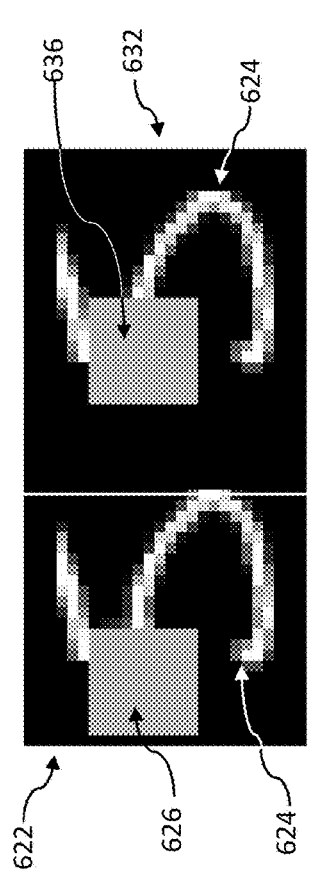
Figure 6C:
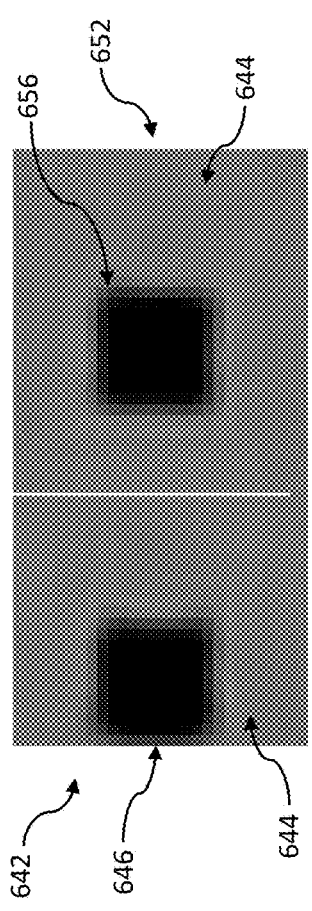

FIGS. 6A-C are illustrative diagrams of an image pair input and output from a trained neural network, in accordance with various embodiments. In some embodiments, FIGS. 6A-C include illustrative diagrams of image pairs including a first image having a background image and a common image located at a first location and a second image having the background image and the common image located at a second location, the first image having a placeholder for the common image at the first location and the second image having the placeholder for the common image at the second location, and images including information about a location of the common image in the first image and the second image obtained using a trained neural network, respectively. In FIG. 6A, a pair of data items 602 and 612 may be obtained. Data items 602 and 612 may each include common background image data 604. Data items 602 and 612 may further include common image data 606 and 616, respectively, where common image data 606 may be at a first location in data item 602 and common image data 616 may be at a second location in data item 612. Common image data 606 and 616 may be substantially similar with the exception that each is located at a different location within data item 602 and 616, respectively.

In some embodiments, data items 602 and 612 may be a first image and a second image, respectively. For example, the first image and the second image may include a common background image (e.g., the number "5"). Overlaid on top of the common background image may be a common image (e.g., the number "7"), which may be located at a first location in the first image and a second location in the second image.

Data items 602 and 612 may be provided to prediction model 120 subsequent to prediction model 120 updating one or more configurations based on training data. For example, prediction model 120 may update one or more configurations based on data items 542 and 552, as target output indications including data items 502 and 512 serving as reference feedback. In some embodiments, prediction model 120, after training, may be capable of determining a predicted location of common data within image pairs. Therefore, after inputting data items 602 and 612 to prediction model 120, information indicating predicted locations 646 and 656 of common data 606 and 616 may be obtained, as seen in FIG. 6C. For instance, data items 642 and 652 may be output from prediction model 120, and may include information indicating predicted locations 646 and 656.

In some embodiments, prediction model 120 may determine predicted locations 646 and 656 by identifying a difference in locations of common data 606 and 616 within data items 602 and 612, respectively. For instance, both data items 602 and 612 include background data 604. No appreciative difference may be detected by prediction model 120 with respect to background data 604 between data items 602 and 612, as background data 604 is static. However, common data 606 and 616 changes locations. Prediction model 120 may detect the difference in locations of common data 606 and 616, and may output information indicating predicted locations 646 and 656 of common data 606 and 616. In some embodiments, the output of prediction model 120 may be images (e.g., a first image and a second image). For example, images may be output including a dark block indicating the predicted location of a common image within each of the images. In this example, the background image may be constant as the background image is the same in both input images.

In FIG. 6B, a first data item 622 and a second data item 632 are described. First data item 622 and second data item 632 may both include common background data 624. For example, first data item 622 and second data item 632 may both include a background image of the number "5". Each of data items 622 and 632 may further include a placeholder 626 and 636, respectively. Placeholders 626 and 636 may represent a location of common image data 606 and 616 within data items 602 and 612, respectively. In some embodiments, placeholders 626 and 636 may include label information indicating a location of common image data 606 and 616, respectively. In some embodiments, after the information indicating predicted locations 646 and 656 is obtained from prediction model 120, the label information may be used to further update configurations of prediction model 120.

Figure 7:
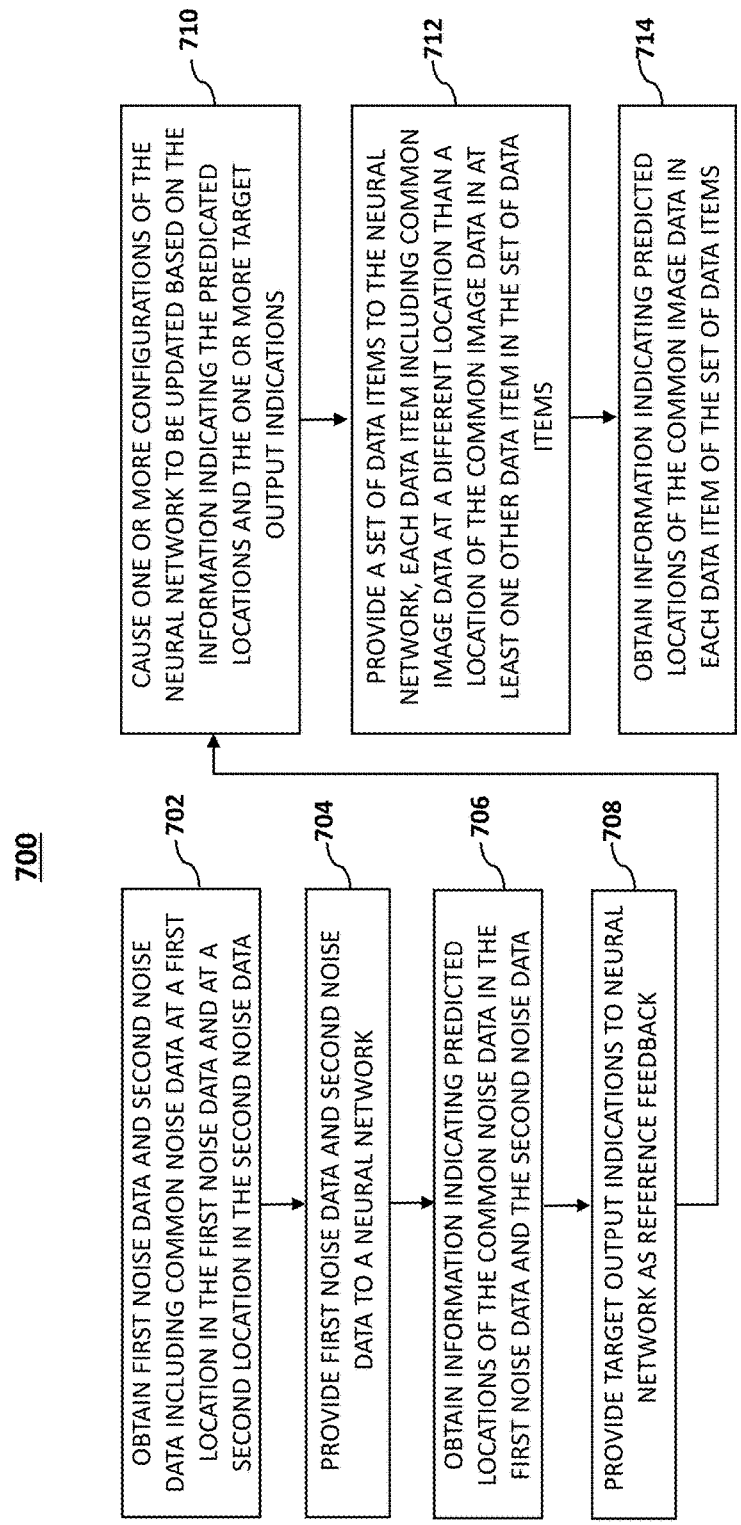
FIG. 7 is an illustrative flowchart of an exemplary process for training a neural network to locate common image data within a set of images, in accordance with various embodiments.

FIG. 7 is an illustrative flowchart of an exemplary process for training a neural network to locate common image data within a set of images, in accordance with various embodiments. Process 700 may, in some embodiments, begin at step 702. At step 702, first noise data and second noise data may be obtained. The first noise data may include common noise data at a first location in the first noise data and the second noise data may include common noise data at a second location in the second noise data. For example, noise data 502 may include common noise data 506 located at a first location, and noise data 512 may include common noise data 516 at a second location. In some embodiments, the first location and the second location may differ. For example, the first location may be a first coordinate or set of coordinates in a first image's pixel array, while the second location may be a second coordinate or set of coordinates in a second image's pixel array. The second coordinate or set of coordinates may be shifted one or more pixels in one or more axes with respect to the first coordinate or set of coordinates.

At step 704, the first noise data and the second noise data may be provided to a neural network. For example, noise data 502 and noise data 512 may be provided to prediction model 120. In some embodiments, the first noise data and the second noise data may be training data for training a neural network to detect apparent motion in stereoscopic imagery. For instance, prediction model 120 may be trained using noise data 502 and noise data 512 to detect a change in a location of common noise data 506 to a location of common noise data 516.

At step 706, information indicating predicted locations of the common noise data in the first noise data and the second noise data may be obtained. In some embodiments, prediction model 120 may output data items 542 and 552, which may include predicted locations 546 and 556 of common noise data 506 and 516, respectively. For instance, prediction model 120 may generate information that indicates where within the input data the common data, if any, exists. In some embodiments, because each of first noise data 502 and second noise data 512 include background noise data 504, prediction model 120 is able to discriminate background noise data 504. The differences between first noise data 502 and second noise data 512 may be a difference in a location of common noise data 506 with respect to first noise data 502 and a location of common noise data 516 with respect to second noise data 512. In some embodiments, prediction model 120 may output data items 542 and 552 including predicted locations 546 and 556 of common noise data 506 and 516, respectively. In some embodiments, prediction model 120 may output information indicating predicated locations 546 and 556 of common noise data 506 and 516.

At step 708, target output indications may be provided to the neural network as reference feedback. In some embodiments, the target output indications may include information indicating locations of the common noise data in the first noise data and the second noise data. For example, the target output indications may include information indicating the locations of common noise data 506 and 516 within noise data 502 and 512, respectively. In some embodiments, the reference feedback provided to prediction model 120 may include the previously provided input data. For example, noise data 502 and 512 may be provided to prediction model 120 as reference feedback. Prediction model 120 may be configured to assess differences between the predicted locations 546 and 556 of noise data 506 and 516 with the locations of noise data 506 and 516 in input noise data 502 and 512, respectively.

At step 710, one or more configurations of the neural network may be caused to be updated based on the information indicating the predicted locations of the common noise data and the target output indications. For instance, prediction model 120 may determine one or more configurations of prediction model 120 that are to be updated based on an assessment of predicated locations 546 and 556 with respect to the locations of common data 506 and 516 as indicated by the reference feedback of noise data 502 and 512. In some embodiments, if predicted locations 546 and 556 satisfy threshold location criteria associated with matching locations within images, as determined with respect to the locations of common noise data 506 and 516, then this may indicate that no adjustments are needed. As an example, where prediction model 120 corresponds to a neural network, no adjustments to the weights and activation states of neural units within the neural network may be needed if the threshold location criteria is satisfied. However, if predicted locations 546 and 556 differ from the locations of common noise data 506 and 516, then one or more adjustments to the weights and activation states of the neural units within the neural network may be made.

In some embodiments, noise data 522 and 532, including placeholders 526 and 536 for common noise data 506 and 516, respectively, may be provided to prediction model 120 prior to the configurations being updated. Placeholders 526 and 536 of noise data 522 and 532 may include information that may be used as labels for the first location of common noise data 506 in noise data 502 and the second location of common noise data 516 in noise data 512. In some embodiments, the configurations of prediction model 120 may be updated further based on noise data 522 and 532 including placeholders 526 and 536. In some embodiments, the configurations of prediction model 120 may be updated further based on information indicating the locations of placeholders 526 and 536, and thus the locations of common noise data 506 and 516, respectively.

At step 712, a set of data items may be provided to the neural network. Each data item of the set may include common image data at a different location than a location of the common image data in at least one other data item of the set. In some embodiments, the set of data items may include first data item 602 and second data item 612. First data item 602 may include common image data 606 located at a first location, and second data item 612 may include common image data 616 located at a second location. First data item 602 and second data item 612 may be provided to prediction model 120. In some embodiments, first data item 602 and second data item 612 may be provided to prediction model 120 subsequent to the configurations of prediction model 120 being updated, as described at step 710.

At step 714, information indicating predicated locations of the common image data in each data item of the set of data items may be obtained. For instance, prediction model 120 may output the indication indicating the predicted locations of the common image data in each data item input to prediction model 120. In some embodiments, data items 642 and 652 may be output from prediction model 120. Data items 642 and 652 may include information indicating the predicted locations 646 and 656 of common image data 606 and 616. In some embodiments, the information indicating the predicted locations 646 and 656 may be output from prediction model 120 without data items 642 and 652. In some embodiments, first data item 602 and second data item 612 may be part of a set of images provided to prediction model 120. Each image of the set of images may include common image data 606 and 616, located at different locations within their respective images, as well as common background image data 604. For example, first data item 602 may be a first image including a background image of a number "5" and a common image of a number "7" located at a first location within the first image. Second data item 612 may be a second image including the background image of the number "5" and the common image of the number "7" located at a second location within the second image. In this example, the first location of the common image (e.g., the number "7") differs from the second location of the common image. In some embodiments, the background image may differ from the first image to the second image. For instance, background 604 within data item 602 may include one or more regions that differ from the background in data item 612. As an example, one or more regions of the background image where a common image was located may be visible after the common image shifts from the first location to the second location, and similarly one or more regions of the background image where the common image shifts to may no longer be visible in the second image as compared to the first image.

Figure 8C:
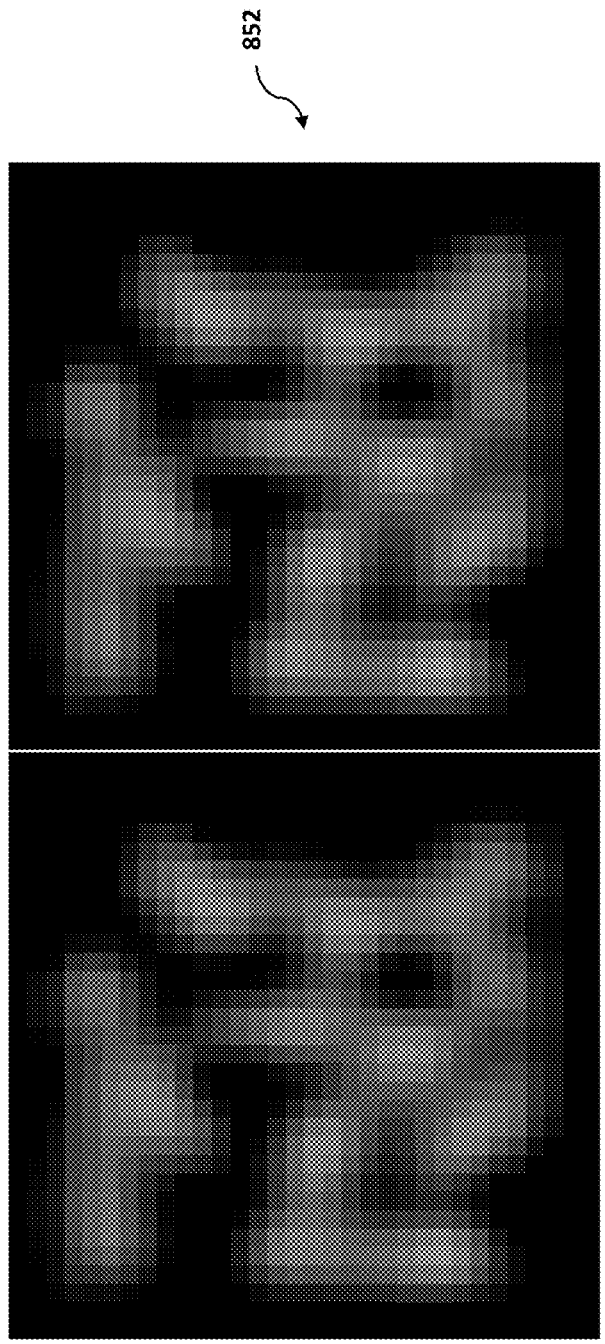

FIGS. 8A-C are illustrative diagrams of image pairs including a randomly generated set of noise blocks randomly displaced for training a neural network to segment arbitrary shapes, in accordance with various embodiments. In some embodiments, FIGS. 8A-C include illustrative diagrams of image pairs with a randomly generated set of noise blocks randomly displaced, image pairs indicating the location and movement of the randomly generated noise data, and an output of a neural network trained using the image pairs of FIGS. 8A and 8B to segment the arbitrary shape, respectively. In FIG. 8A, first noise data 802 and second noise data 812 are illustrated. First noise data 802 includes an image of randomly generated noise and second noise data 812 includes an image of randomly generated noise where one or more segments are randomly displaced with respect to first noise data 802. In some embodiments, first noise data 802 may include background noise data 804 and one or more segments of noise data 806 and 808. Second noise data 812 may include background noise data 814 and one or more segments of noise data 816 and 818. In some embodiments, segment 816 of second noise data 812 may correspond to segment 806 shifted in location. For example, segment 816 may correspond to segment 806 after being shifted one pixel to the right along a first axis and three pixels down along a second axis. In some embodiments, segment 818 of second noise data 812 may correspond to segment 808 of first noise data 802. Here, segment 808 has not been shifted, and therefore segment 818 is located in a same location within second noise data 812. In some embodiments, segments of background noise data 804 may be randomly selected and shifted in a similar manner to produce second noise data 812. First noise data 802 and second noise data 812 may be provided to prediction model 120 to train prediction model 120 to identify arbitrary structure within input data. For example, training prediction model 120 to identify arbitrary structure using movement information between noise data 802 and 812 may be employed for video segmentation.

In FIG. 8B, a first data item 822 and second data item 832 are illustrated. In some embodiments, first data item 822 and second data item 822 may illustrate the movement of the segments of noise within from first noise data 802 and second noise data 804, respectively. For instance, first data item 822 and second data item 832 may correspond to masks representative of the segments that were shifted. For example, segment 826 corresponds to segment 806 of noise data 802. Similarly, segment 836 corresponds to segment 816 of noise data 812. In some embodiment, segment 836 illustrates that segment 826 shifted three pixels to the right and one pixel down as a result of segment 806 being shifted three pixels to the right and one pixel down. Segments that have differing data may be represented by gray blocks, as seen by segments 836 and 826. Conversely, segment 808 of noise data 802 did not shift within noise data 812, as illustrated by segment 818. Therefore, in data items 822 and 832, segment 828 and 838 both illustrate a black block, indicating that the data within each of segments 808 and 818 are the same.

In some embodiments, noise data 802 and 812 may be provided to prediction model 120. Prediction model 120 may be configured to identify the segments within noise data 802 and 812 that shifted in order to train prediction model 120 to identify apparent motion. In some embodiments, data items 822 and 832 may be provided to prediction model 120 as labels to indicate locations of the segments that have shifted.

In FIG. 8C, data items 842 and 852 are shown. In some embodiments, data items 842 and 852 may be output from prediction model 120. For instance, data items 842 and 852 include information indicating predicted locations of the segments that shifted from noise data 802 to noise data 812. The predicted locations may correspond to the locations that prediction model 120 estimates shifts in the noise data occurred. In some embodiments, prediction model 120 may output the information indicating the predicted locations of the segments.

In some embodiments, one or more target output indications may be provided to prediction model 120 as reference feedback to cause one or more configurations of prediction model 120 to be updated. For example, noise data 802 and 812 may be provided to prediction model 120 as reference feedback to cause one or more configurations (e.g., weights associated with neural units of a neural network) to be updated. Based on the target output indications and the information indicating the predicted locations of the shifted noise data, one or more configurations of prediction model 120 may be updated. In some embodiments, the configurations may further be updated based on the location information included within data items 822 and 832. For instance, data items 822 and 832 may be provided to prediction model 120 as labels for identifying the locations of the shifted noise data.

FIGS. 9A and 9B are illustrative diagrams of an image pair input and output from a trained neural network, in accordance with various embodiments. In some embodiments, FIGS. 9A and 9B include illustrative diagrams of an image pair representing an object and a modified object input to a neural network trained using the image pairs of FIGS. 8A-C, and image pairs output by the neural network in response to the image pair being provided to the trained neural network, respectively. In FIG. 9A, a first data item 902 is shown including an object. For example, the object may include a representation of the number "7". Also included within FIG. 9A is a second data item 912, which includes the object shifted to a different location. For example, the object (e.g., the number "7") may be shifted to the right and down in data item 912 as compared to data item 902. In data item 902, the solid red horizontal line illustrates an initial vertical location of a portion of the object, and the solid red vertical line illustrates an initial horizontal location of the same portion of the object. In data item 912, the object has been shifted, and the solid red horizontal line illustrates the new vertical location while the solid red vertical line shows the new horizontal location of the portion of the object. In some embodiments, the dashed vertical red line indicates the corresponding initial horizontal location as seen in data item 902, while the dashed horizontal red line indicates the corresponding initial vertical location as seen in data item 902.

In some embodiments, data items 902 and 912 may be provided to prediction model 120 to train prediction model 120 to identify the motion of the object from data item 902 to data item 912. For instance, subsequent to one or more configurations of prediction model 120 being updated, data items 902 and 912 may be provided to prediction model 120. As mentioned above, the configurations of prediction model 120 may be updated responsive to training using noise data 802 and 812, for example.

As seen in FIG. 9B, in some embodiments, prediction model 120 may be configured to output data items 942 and 952 in response to receiving data items 902 and 912 as inputs. Data items 942 and 952 may include representations of an object as identified by prediction model 120. Using the noise training, prediction model 120 may be capable of recognizing the object within input data items 902 and 912 and outputting an estimated representation of the object (e.g., providing a rendering of a shape of the object, emphasizing all pixels predicted to represent the object, etc.). Furthermore, data items 942 and 952 may include location information indicating a predicted location of the estimated representation of the object. For example, data item 942 may include a representation of an object (e.g., the number "7") generated by prediction model 120 at a predicted location corresponding to the location of the object within data item 902. Data item 952 may include a representation of the object (e.g., the number "7") generated by prediction model 120 at a predicted location corresponding to the location of the object within data item 912. In some embodiments, the representation of the object within data item 952 may also be shifted to the right and down with respect to the object within data item 942, similarly to the shift in the object in data item 912 from data item 902.

FIGS. 10A-C are illustrative diagrams of a set of images including different background noise data and different correlated noise data used to train a neural network to locate correlated data, in accordance with various embodiments. In some embodiments, FIGS. 10A-C include illustrative diagrams of a set of images including different background noise data and different correlated noise data, the set of images including the different background noise data with a placeholder at the locations of the different correlated noise data, and the set of images including information indicating predicted locations of the different correlated noise data obtained from a neural network, respectively. In FIG. 10A, noise data 1002, 1012, and 1024 are illustrated. Each of noise data 1002, 1012, and 1024 include background noise data 1004, 1014, and 1024, respectively. In some embodiments, background noise data 1004, 1014, and 1024 may be randomly generated noise data, and different randomly generated noise data may be represented within each noise data 1002, 1012, and 1024. For example, noise data 1002, 1012, and 1024 may each be images including different backgrounds of noise. In some embodiments, each of noise data 1002, 1012, and 1024 may also include correlated noise data 1006, 1016, and 1026, respectively. Correlated noise data 1006, 1016, and 1026 may differ from one another. In some embodiments, correlated noise data 1006, 1016, and 1026 may refer to "texture" within noise, indicative of sections of an image having weakly spatially correlated noise blocks. In some embodiments, one or more of noise data 1002, 1012, and 1024 may be provided to a neural network to train the neural network to perform texture discrimination. For instance, prediction model 120 may be trained using one or more of noise data 1002, 1012, and 1024 to detect regions including correlated noise.

In some embodiments, correlated noise data 1006, 1016, and 1026 may be noise data that is not completely random, but instead has a small amount of correlation. For example, randomly generated noise may be produced using a random generator, which may randomly select an intensity value for each pixel (e.g., randomly select a value between 0.0 and 1.0). In this example, the likelihood of two adjacent pixels having the same intensity value is small as each intensity value may be randomly selected from a Gaussian distribution of intensity values.

Correlated noise data however may refer to noise produced by a generator that includes a correlation factor such that there is a higher likelihood that two adjacent pixels will have the same or similar intensity value. For example, instead of an intensity value being randomly selected from a Gaussian distribution of intensity values, an intensity value may be selected using a weighted distribution centered about the intensity value of a neighboring value. As another example, correlated noise data may be generated by first generating noise data where each pixel is generated independently. Next, the noise image can be convolved with a randomly generated 3×3 kernel to create correlation between each pixel and the neighboring pixels.

In some embodiments, the correlated noise data may include an image pattern. For instance, an image pattern may be obtained, and the image pattern may be overlaid on a background noise image at a random location. The image pattern may include one or more repeating element or repeating elements. As an example, the image pattern may include dots, waves, or other visual objects that repeat within a given region of an image. As another example, the image pattern may be an image of a solid color or a gradient (e.g., gradual blending of one color to another). As yet another example, the image pattern may include a distortion applied to an image (e.g., a blurring, darkening, etc.). Still further, the image pattern used for the correlated noise data may, in some embodiments, be generated using a Garbor filter.

In some embodiments, the correlated noise data may be generated using a pseudorandom noise generator. A pseudorandom number generator may be configured to select a number from a uniform distribution of numbers, and subsequently modifying the selected number using a random variant. In some embodiments, the pseudorandom noise generator may be configured to generate a number based on an initial value. The correlated noise data may therefore be generated by obtaining a plurality of intensity values using the pseudorandom noise generated based on that seed value.

In some embodiments, the correlated noise data may be obtained by generating random noise and applying a filter to the random noise. For example, a high pass, low pass, Garbor, or other filter may be applied to randomly generated noise to filter out certain portions of the random noise. The remaining data (e.g., the unfiltered noise) may be correlated.

In FIG. 10B, noise data 1032, 1042, and 1052 are illustrated. In some embodiments, each of noise data 1032, 1042, and 1052 may include background noise data 1004, 1014, and 1024, respectively. However, instead of including correlated noise data 1006, 1016, and 1026, noise data 1032, 1042, and 1052 may include placeholders 1036, 1046, and 1056, respectively. Placeholders 1036, 1046, and 1056 may be respectively located at a location of correlated noise data 1006, 1016, and 1026. In some embodiments, noise data 1032, 1042, and 1052 may be provided to prediction model 120 as labels for the locations of correlated noise data 1006, 1016, and 1026, and may be used to update one or more configurations of prediction model 120.

In FIG. 10C, data items 1062, 1072, and 1082 are illustrated. In some embodiments, data items 1062, 1072, and 1082 may be an output of prediction model 120, and may include information indicating predicted locations 1066, 1076, and 1086 of correlated noise data 1006, 1016, and 1026. For example, data items 1062, 1072, and 1082 may represent the locations of the correlated noise data as determined by prediction model 120 within the input data. Backgrounds 1064, 1074, and 1084 of data items 1062, 1072, and 1082, respectively, may be monochromatic to reflect that prediction model 120 did not detect any correlated data within those portions of input noise data 1002, 1012, and 1022. In some embodiments, prediction model 120 may output information indicating predicted locations 1066, 1076, and 1086 instead of, or in addition to, outputting data items 1062, 1072, and 1082.

In some embodiments, one or more target output indications may be provided to prediction model 120 as reference feedback to cause one or more configurations of prediction model 120 to be updated. The target output indications may indicate the locations of correlated noise data 1006, 1016, and 1026 within noise data 1002, 1012, and 1022, respectively. For example, the reference feedback may include noise data 1002, 1012, and 1022. Prediction model 120 may use the target output indications and the information indicating predicted locations 1066, 1076, and 1086 to assess whether adjustments to the configurations are needed. For example, the target output indications and the information may be used to assess whether the weights and activation states of the neural units of a neural network are to be adjusted. In some embodiments, prediction model 120 may be configured to cause one or more configurations of prediction model 120 to be updated based on an assessment of predicted locations 1066, 1076, and 1086 with respect to the locations of correlated noise data 1006, 1016, and 1026 from the target output indications and the neural network output. In some embodiments, data items 1032, 1042, and 1052 may also be provided to prediction model 120 to be used as labels for noise data 1002, 1012, and 1012, respectively. The configurations of prediction model 120 may be updated further based on data items 1032, 1042, and 1052. In some embodiments, prediction model 120 may cause the configurations to be updated prior to receipt of input data to be analyzed for texture discrimination.

FIGS. 11A-C are illustrative diagrams of a set of images input and output from a trained neural network, in accordance with various embodiments. In some embodiments, FIGS. 11A-C include illustrative diagrams of a set of images including different background noise data and different correlated image data to be provided to a neural network, the set of images including the different background noise data and a placeholder at the locations of the different correlated image data, and the set of images including information indicating predicated locations of the different correlated image data obtained from the neural network, respectively. In FIG. 11A, a set of data items 1102, 1112, and 1122 may be obtained. Data items 1102, 1112, and 1122 may include background noise data 1104, 1114, and 1124, respectively. In some embodiments, background noise data 1104, 1114, and 1124 may each differ. For example, background noise data 1104, 1114, and 1124 may each be obtained by randomly generating background noise data. Data items 1102, 1112, and 1122 may further include correlated image data 1106, 1116, and 1126, respectively, where correlated image data 1106 may be at a first location in data item 1102, correlated image data 1116 may be located at a second location in data item 1112, and correlated image data 1126 may be located at a third location in data item 1122. In some embodiments, correlated image data 1106, 1116, and 1126 may differ from one another and may further be located at different locations with respect to each data item.

Data items 1102, 1112, and 1122 may be provided to prediction model 120 subsequent to prediction model 120 updating one or more configurations based on training data. For example, prediction model 120 may update one or more configurations based on data items 1062, 1072, and 1082, and target output indications including noise data 1002, 1012, and 1022 serving as reference feedback. In some embodiments, prediction model 120, after training, may be capable of determining a predicted location of correlated data within an image or a set of images. Therefore, after inputting data items 1102, 1112, and 1122 to prediction model 120, information indicating predicted locations 1166, 1176, and 1186 of correlated data 1106, 1116, and 1126 may be obtained, as seen in FIG. 11C. For instance, data items 1162, 1172, and 1182 may be output from prediction model 120, and may include information indicating predicted locations 1166, 1176, and 1182, where prediction model 120 predicts that correlated data 1106, 1116, and 1126 were located within their respective input data items.

In some embodiments, prediction model 120 may determine predicted locations 1166, 1176, and 1186 by identifying where correlated image data exists within data items 1102, 1112, and 1122, respectively. As an example, data item 1102 includes background noise data 1104, which may be uncorrelated. For instance, each pixel of noise of background noise data 1104 may be randomly selected with respect to any adjacent pixel. Prediction model 120 may be configured to detect the portions of input data item 1102 where correlation is present (e.g., correlated data 1106). In some embodiments, the output of prediction model 120 may be images (e.g., a first image, a second image, and a third image). For example, images may be output including a dark block indicating the predicted location of correlated data within each of the images. In this example, the background image of the output image may be constant as the background image may represent uncorrelated imagery.

In FIG. 11B, data items 1132, 1142, and 1152 are described. Data items 1132, 1142, and 1152 may each include background noise data 1104, 1114, and 1124, which may be the same background noise data of data items 1102, 1112, and 1122, respectively. Each of data items 1132, 1142, and 1152 may further include placeholders 1136, 1146, and 1156, respectively. Placeholders 1136, 1146, and 1156 may represent a location of correlated image data 1106, 1116, and 1126 within data items 1102, 1112, and 1122, respectively. In some embodiments, placeholders 1136, 1146, and 1156 may include label information indicating a location of correlated image data 1106, 1116, and 1126, respectively. In some embodiments, after the information indicating predicted locations 1166, 1176, and 1186 is obtained from prediction model 120, the label information may be used to further update configurations of prediction model 120.

Figure 12:
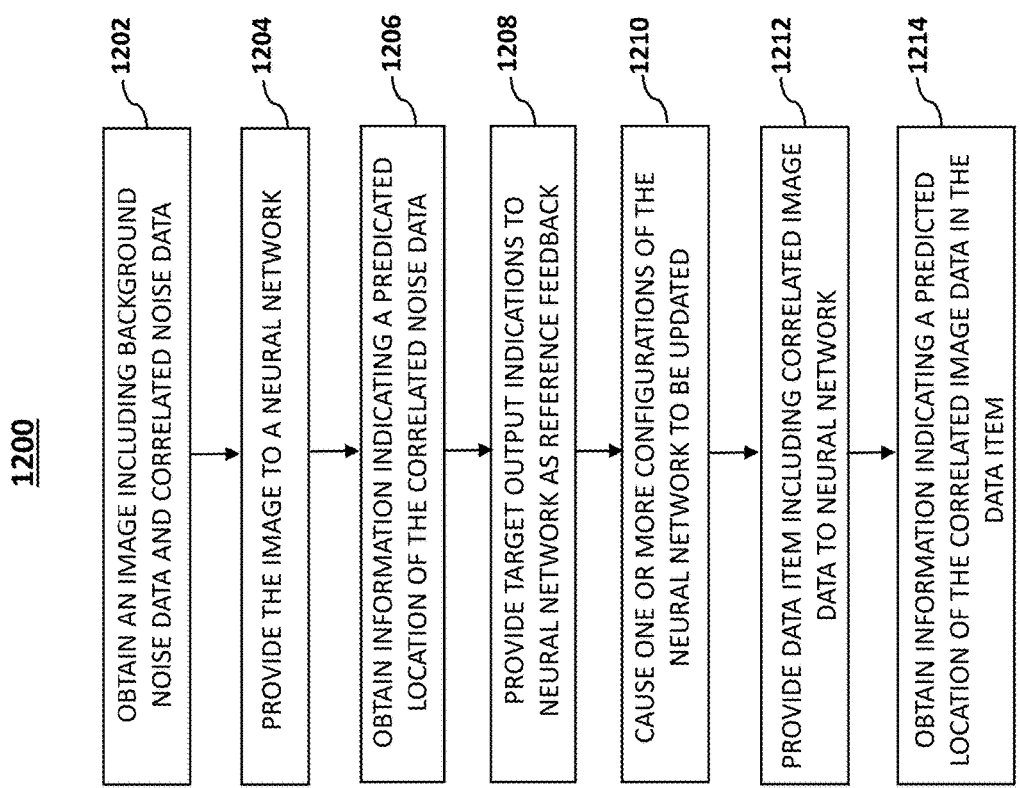
FIG. 12 is an illustrative flowchart of a process for training a neural network to obtain information indicating a predicted location of correlated data, in accordance with various embodiments.

FIG. 12 is an illustrative flowchart of a process for training a neural network to obtain information indicating a predicted location of correlated data, in accordance with various embodiments. In some embodiments, process 1200 may begin at step 1202. At step 1202, an image including background noise data and correlated noise data may be obtained. For example, noise data 1002, including background noise data 1004 and correlated noise data 1006, may be obtained. In some embodiments, a set of images each including different background noise data and different correlated noise data may be obtained. For example, noise data 1002 including background noise data 1004 and correlated noise data 1006, noise data 1012 including background noise data 1014 and correlated noise data 1016, and noise data 1022 including background noise data 1024 and correlated noise data 1026, may be obtained. In some embodiments, background noise data 1004, 1014, and 1024 may include randomly generated noise and correlated noise data 1006, 1016, and 1026 may include noise data having one or more aberrations causing correlations between image pixels of the correlated noise data.

At step 1204, the obtained image may be provided to a neural network. For example, noise data 1002 may be provided to prediction model 120 for training prediction model 120 to detect correlated data (e.g., texture discrimination). In some embodiments, a set of images may be provided to the neural network as opposed to a single image. For example, if a set of images are obtained at step 1202, then the set of images may be provided to prediction model 120.

At step 1206, information indicating a predicted location of the correlated noise data may be obtained. In some embodiments, prediction model 120 may, upon receipt of input data (e.g., noise data 1002), output data item 1062. Output data item 1062 may include information indicating a predicated location 1066 of correlated noise data 1006 in noise data 1002. If a set of images were provided to prediction model 120, then the information output by prediction model 120 may indicate the predicated locations of the correlated noise data in each image. In some embodiments, the correlated noise data may differ in location within each of the input images, and so the predicted locations of the correlated noise data may also differ.

At step 1208, one or more target output indications may be provided to the neural network as reference feedback. In some embodiments, the target output indications may indicate a location of the correlated noise data in the image. For example, the target output indications may include noise data 1002, which may include correlated noise data 1006. Prediction model 120 may be configured to assess the predicted location of the correlated noise data based on the reference feedback. For example, prediction model 120 may assess an accuracy of predicted location 1066 based on receipt of noise data 1002 including correlated noise data 1006. In some embodiments, data item 1032 may also be provided to prediction model 120 as label information indicating the location of correlated noise data 1006. For example, placeholder 1036 may indicate the location of correlated noise data 1006, and therefore data item 1032 may be provided to prediction model 120 to be used as label information for training of prediction model 120 to predict the location of correlated data 1006.

At step 1210, one or more configurations of the neural network may be caused to be updated. In some embodiments, the configurations of prediction model 120 may be updated based on the information indicating predicted location 1066 of correlated noise data 1006 and the target output indications corresponding to the location of correlated noise data 1006. In some embodiments, prediction model 120 may be a neural network, and the configurations of the neural network may be associated with one or more weights and activation states of neural units. For instance, based on the assessment of the predicted location of the correlated noise data and the location of the correlated noise data, the neural network may adjust weights associated with one or more neural units to reduce an error between the predicted location of the correlated noise data and the location of the correlated noise data. In some embodiments, the configurations may be updated further based on the label information indicating the location of the correlated noise data. For example, the configurations of prediction model 120 may be updated further based on data item 1032 including placeholder 1036 at the location of correlated noise data 1006 in noise data 1002.

At step 1212, a data item including correlated image data may be provided to the neural network. In some embodiments, the data item may be an image provided to prediction model 120 subsequent to the configurations being updated. For example, data item 1102 including correlated image data 1106 may be provided to prediction model 120. At step 1214, information indicating a predicated location of the correlated image data in the data item may be obtained. For example, data item 1162 may include information indicating predicated location 1166 of correlated image data 1106 of data item 1102.

Figure 13:
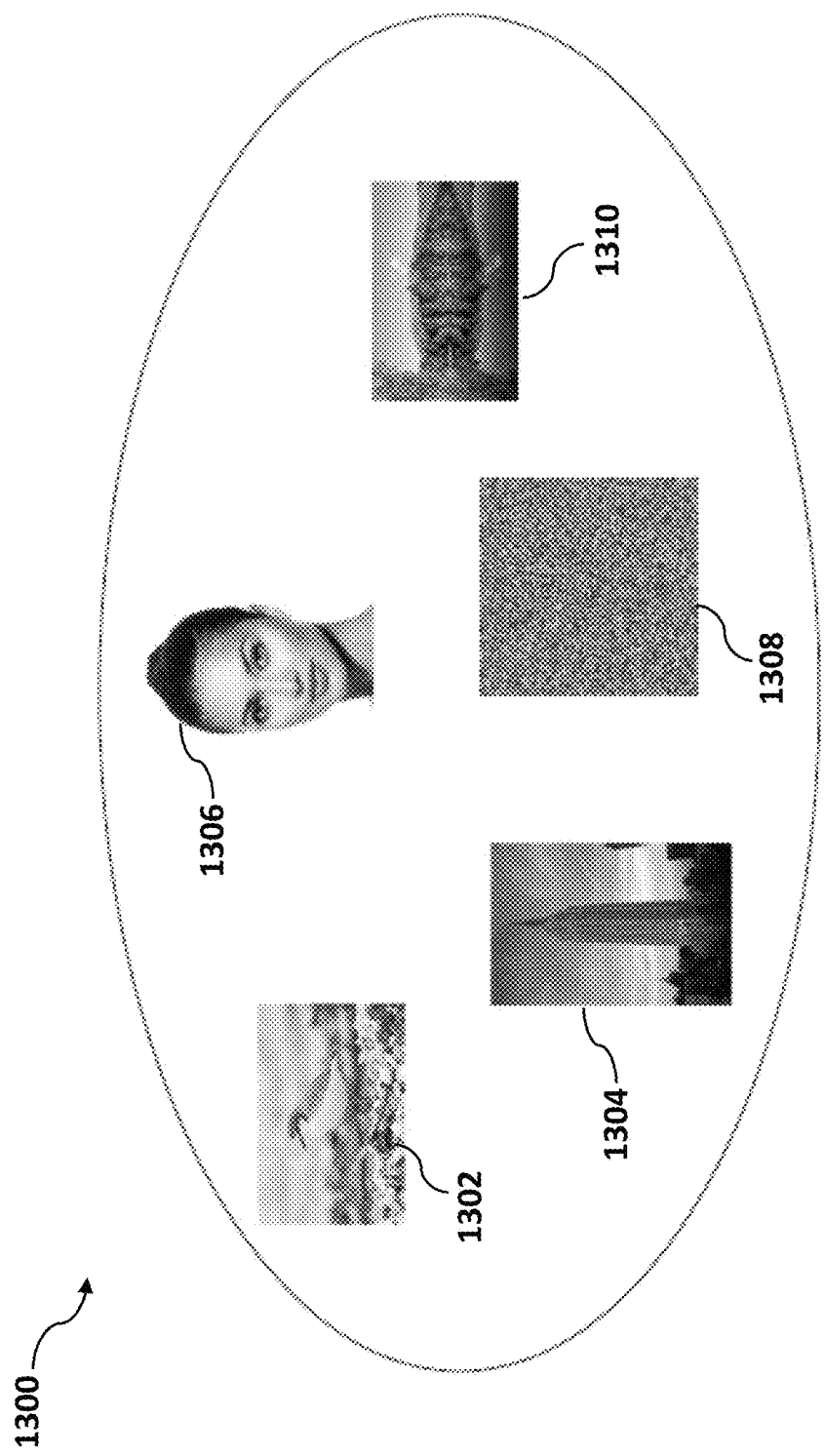
FIG. 13 is an illustrative diagram of a collection of images from the image domain, in accordance with various embodiments.

FIG. 13 is an illustrative diagram of a collection of images from the image domain, in accordance with various embodiments. In FIG. 13, a collection of images 1300 from the possible image domain is shown. The image domain corresponds to all the various types of images that could have possibly been viewed. When an image capturing device, such as a camera, is capturing an image, that camera is capable of viewing everything. In other words, a picture—which includes an array of pixels configured to different intensities—looked at from the perspective of any individual pixel of that picture, can have each individual pixel vary in intensity to any value. The entire input set of images viewable by a camera therefore includes each possible variation in intensity of each pixel of an output image. Therefore, the entire input set of possible images for the camera mostly includes images that look like noise. One of those noise images could represent an object, such as a dog or a cat. Any image can therefore be represented in its entirety by noise as noise spans the entire input set of images.

In some embodiments, collection of images 1300 may include images 1302-1310. For example, image 1302 may represent an image of a bird, image 1304 may represent an image of a building, image 1306 may represent an image of a human face, image 1308 may represent noise, and image 1310 may represent a river view. Collection of images 1300 therefore represents a small subset of possible input images to a camera. Some of the images may represent objects, such as images 1302-1306 and 1310, while a majority of them may represent noise, such as image 1308.

Figure 14:
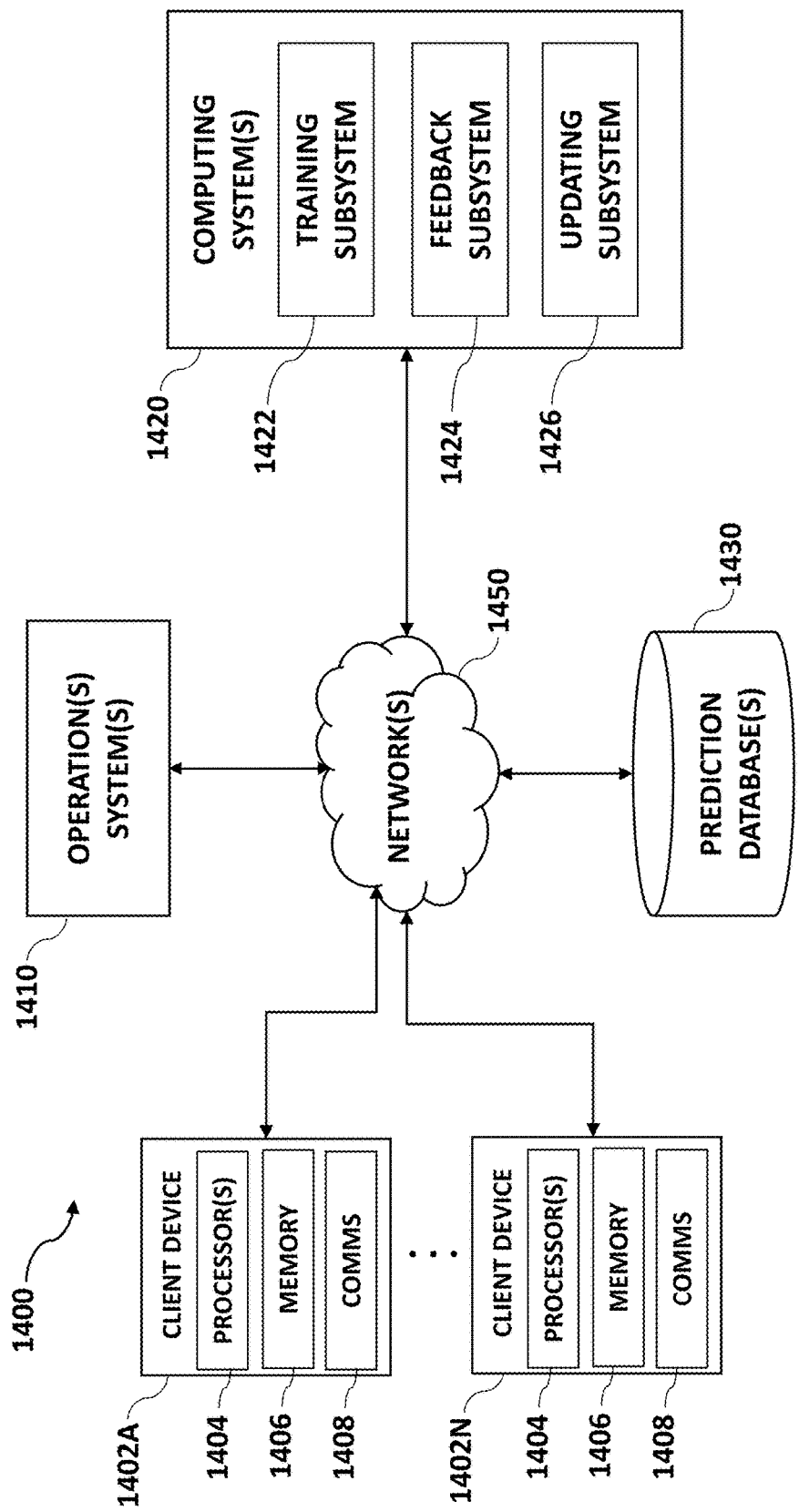
FIG. 14 is an illustrative diagram of a system architecture for training a prediction model, in accordance with various embodiments.

FIG. 14 is an illustrative diagram of a system architecture for training a neural network, in accordance with various embodiments. FIG. 14 includes a system 1400 for training a prediction model, such as prediction model 120 using noise data. In some embodiments, system 1400 may also use the trained prediction model to obtain output data items representing reconstructions of input data items, information indicating predicted locations of common image data, and information indicating predicted locations of correlated image data.

System 1400 may include computing system(s) 1420, client device 1402A-N, which collectively may be referred to as client device(s) 1402, operation(s) system(s) 1410, and prediction database(s) 1430. Each of computer system(s) 1420, client device(s) 1402, operation(s) system(s) 1410, and prediction database(s) 1430 may be capable of communicating with one another across network(s) 1450. In some embodiments, network(s) 1450 may include a single network or a combination of different networks. For example, network(s) 1450 may include a public network (e.g., the Internet), local area networks ("LAN"), wide area networks ("WAN"), a private network, a proprietary network, an intranet, a virtual network, and/or any combination thereof. In some embodiments, various security mechanisms may be implemented to secure communications across network(s) 1450. For example, a transport security layer ("TLS") and/or Secure Sockets Layer ("SSL") protocols may be employed.

Client device 1402 may include one or more processors 1404, memory 1406, and a communications component 1408. Processor(s) 1404 may include a single processor or a plurality of processors (e.g., distributed processors). A processor may be any suitable processor capable of executing or otherwise performing instructions. A processor may include a central processing unit ("CPU") that carries out computer program instructions to perform the arithmetical, logical, and input/output operations. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from memory (e.g., memory 1406). Processor(s) 1404 may be a uni-processor system including one processor or a multi-processor system including any number of suitable processors. Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a field programmable gate array ("FPGA") or an application specific integrated circuit ("ASIC").

Memory 1406 may be configured to store program instructions or data. Program instructions may be executable by a processor (e.g., processor(s) 1404) to implement one or more embodiments of the present techniques. Instructions may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

Memory 1406 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory ("RAM"), static random access memory ("SRAM"), synchronous dynamic RAM ("SDRAM")), bulk storage memory (e.g., CD-ROM and/or DVD-ROM, hard-drives), or the like. Memory 1406 may include a non-transitory computer readable storage medium that may have program instructions stored thereon that are executable by a computer processor (e.g., processor(s) 1404) to cause the subject matter and the functional operations described herein (e.g., processes 300, 700, 1200). Memory 1406 may include a single memory device and/or a plurality of memory devices (e.g., distributed memory devices). Instructions or other program code to provide the functionality described herein (e.g., processes 300, 700, 1200) may be stored on a tangible, non-transitory computer readable media. In some cases, the entire set of instructions may be stored concurrently on the media, or in some cases, different parts of the instructions may be stored on the same media at different times.

Communications component 1408 may be configured to coordinate I/O traffic between processor(s) 1404, memory 1406, and one or more additional components of system 1400. Communications component 1408 may perform protocol, timing, or other data transformations to convert data signals from one component (e.g., memory 1406) into a format suitable for use by another component (e.g., processor(s) 1404). Communications component 1408 may include support for devices attached through various types of peripheral buses, such as a variant of the Peripheral Component Interconnect ("PCI") bus standard or the Universal Serial Bus ("USB") standard. Communications component 1408 may further include a network adapter that provides for connection of client device 1402 to a network, such as network(s) 1450. Communications component 1408 may facilitate data exchange between client device 1402 and other devices connected to network 1450. Communications component 1408 may support wired or wireless communication.

In some embodiments, client device 1402 may include any type of mobile terminal, fixed terminal, or other device. By way of example, client device 1402 may include a desktop computer, a notebook computer, a tablet computer, a smartphone, a wearable device, or other client device. Users may, for instance, utilize one or more client devices 1402 to interact with one another, one or more servers, or other components of system 1400.

Computing system 1420 may include a training subsystem 1422, a feedback subsystem 1424, an updating subsystem 1426, or other components. It should be noted that, while one or more operations are described herein as being performed by particular components of computing system 1420, those operations may, in some embodiments, be performed by other components of computing system 1420 or other components of system 1400. As an example, while one or more operations are described herein as being performed by components of computing system 1420, those operations may, in some embodiments, be performed by components of client device 1402. It should be noted that, although some embodiments are described herein with respect to neural networks models, other prediction models (e.g., statistical models, machine learning models, or other analytics models) may be used in lieu of or in addition to the neural networks in other embodiments (e.g., a statistical model replacing a neural network in one or more embodiments).

As discussed, existing neural networks may classify data for diagnostic purposes. Such neural networks generally rely on labeled training data to train the network. However, such training data can cause the neural network to be biased to look for particular correlated data. For example, a neural network trained using labeled images of dogs or cats will attempt to find a dog or cat in an input image. The full power of the neural network may be skewed due to the biases introduced by the training data. In some embodiments, a neural network trained on noise, which inherently is random, may be free of such correlation effects and therefore may allow the neural network to be trained without any inherent biases.

In some embodiments, system 1400 may use one or more prediction models (e.g., prediction model 120) to output a data item including a reduction in one or more aberrations present in a given input data item, output information indicating predicted locations of common data in data items, output information indicating predicted locations of correlated data in a data item or perform other operations. The prediction models may include neural networks, other machine learning models, or other prediction models. As an example, neural networks may be based on a large collection of neural units (or artificial neurons).

In some embodiments, each prediction model may be trained using randomly generated noise data. In some embodiments, one prediction model may be trained to output a data item including a reduction in one or more aberrations present in a given input data item, another prediction model may be trained to output information indicating predicted locations of common data in data items, and yet another prediction model may be trained to output information indicating predicted locations of correlated data in a data item or perform other operations. For each prediction model, the training data may include randomly generated noise data having one or more aberrations caused by one or more operations performed to the randomly generated noise data, data items including randomly generated noise data as background noise data and common noise data at different locations in each data item, and a data item or set of data items including different randomly generated noise data as background noise data and correlated noise data, respectively.

In some embodiments, a data item may include a document, an audio (e.g., ultrasound or other audio recording), an image (e.g., volumetric scan, ultrasound image, magnetic resonance image ("MM"), x-ray image, etc.), a video (e.g., ultrasound video, MRI video, etc.), a sensor data recording, or other data item. Sensor data recordings may, for example, include recordings of medical sensor signals, such as magnetic field signals, radio frequency ("RF") signals, electroencephalogram ("EEG") signals, electrocardiogram ("ECG") signals, electromyogram ("EMG") signals, mechanomyogram ("MMG") signals, electrooculography ("EOG") signals, magnetoencephalogram ("MEGA") signals, ultrasound image, a computed tomography ("CT") scan image, or other signals.

In some embodiments, training subsystem 1422 may obtain a collection of data items and provide the data items to prediction model 120 (e.g., a neural network). For example, training subsystem 1422 may be configured to obtain randomly generated noise data 202. Training subsystem 1422 may also be configured to provide randomly generated noise data 202 to operations system 1410, and obtain modified noise data 204 representing a modified version of randomly generated noise data 202. As another example, training subsystem 1422 may be configured to generate noise data 502 and 512. As still yet another example, training subsystem 1422 may be configured to generated noise data 1002, 1012, and 1022. In some embodiments, training subsystem 1422 may be configured to provide the training data to prediction model 120. In some embodiments, operations system(s) 1410 may be configured to perform some or all of the operations described above with reference to operations system(s) 110.

In some embodiments, feedback subsystem 1424 may be configured to obtain one or more target output indications to be provided to a neural network as reference feedback to cause one or more configurations of the neural network to be updated. For example, feedback subsystem 1424 may be configured to provide randomly generated noise data 202 to prediction model 120 as reference feedback. As another example, feedback subsystem 1424 may be configured to provide noise data 502 and 512 to prediction model 120 as reference feedback. In this example, feedback subsystem 1424 may also be configured to provide data items 522 and 532 including placeholders 526 and 536 indicating the locations of common noise data 506 and 516 to prediction model 120 in some embodiments. As yet another example, feedback subsystem 1424 may be configured to provide noise data 1002, 1012, and 1022 to prediction model 120 as reference feedback. In this example, feedback subsystem 1424 may also be configured to provide data items 1032, 1042, and 1052, including placeholders 1036, 1046, and 1056 indicating the locations of correlated noise data 1006, 1016, and 1026, respectively, to prediction model 120 as reference feedback.

In some embodiments, updating system 1426 may be configured to cause one or more configurations of a neural network to be updated. For example, updating subsystem 1426 may be configured to cause one or more configurations of prediction model 120 to be updated based on randomly generated noise data 202 and reconstruction 204 of randomly generated noise data 202. As another example, updating subsystem 1426 may be configured to cause one or more configurations of prediction model 120 to be updated based on information indicating predicated locations 546 and 556 of common noise data 506 and 516 of noise data 502 and 512, as well as reference feedback corresponding to noise data 502 and 512. As yet another example, updating subsystem 1426 may be configured to cause one or more configurations of prediction model 120 to be updated based on information indicating predicated locations 1066, 1076, and 1086 of correlated noise data 1006, 1016, and 1026, as well as noise data 1002, 1012, and 1022.

In some embodiments, system 1400 may also include prediction database(s) 1430. Prediction database(s) 1430 may include a single database or a plurality of databases. In some embodiments, prediction database(s) 1430 may be distributed amongst a plurality of server devices. Prediction database(s) 1430 may be configured to store training data, such as training data obtained by training subsystem 1422. For example, in response to obtaining randomly generated noise data 202, training subsystem 1422 may cause randomly generated noise data to be stored within prediction database 1430. In some embodiments, prediction database(s) 1430 may be configured to store weights, thresholds, and activation state information associated with one or more neural units of a neural network. Updating subsystem 1426 may cause some or all of the weights, thresholds, and/or activation state information to be adjusted in response to assessing which configurations are to be updated.

In some embodiments, various computers subsystems illustrated in FIG. 14 may include one or more computing devices that are programmed to perform the functions described herein. The computing devices may include one or more electronic storages (e.g., prediction database(s) 1430, or other electric storages), one or more physical processors programmed with one or more computer program instructions, and/or other components. The computing devices may include communication lines or ports to enable the exchange of information with a network (e.g., network 1450) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 1422-1426 or other subsystems and/or the functions associated with process 300, 700, and 1200. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 1422-1426 described herein is for illustrative purposes, and is not intended to be limiting, as any of subsystems 1422-1426 may provide more or less functionality than is described. For example, one or more of subsystems 1422-1426 may be eliminated, and some or all of its functionality may be provided by other ones of subsystems 1422-1426. As another example, additional subsystems may be programmed to perform some or all of the functionality attributed herein to one of subsystems 1422-1426.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A method comprising: obtaining input noise data; providing the input noise data to a prediction model to cause the prediction model to generate an output related to the input noise data; providing one or more target output indications to the prediction model to update one or more portions of the prediction model, wherein the one or more portions of the prediction model are updated based on the related output and the one or more target indications.

A2. The method of embodiment A1, wherein the prediction model comprises a neural network or other machine learning model.

A3. The method of any of embodiments A1-A2, wherein the input noise data is obtained by modifying randomly generated noise data to generate the input noise data.

A4. The method of any of embodiments A1-A2, wherein the input noise data comprises modified noise data reflecting a modified version of noise data, and the one or more target output indications comprise the noise data.

A5. The method of embodiment A4, wherein the related output comprises a reconstruction of the noise data.

A6. The method of any of embodiments A1-A2, wherein the input noise data comprises noise data, and the one or more target output indications comprise modified noise data reflecting a modified version of the noise data.

A7. The method of embodiment A6, wherein the related output comprises a reconstruction of the modified noise data.

A8. The method of any of embodiments A1-A7, wherein providing the one or more target output indications to the prediction model causes the prediction model to assess the related output (e.g., against the one or more target output indications), and wherein the prediction model updates the one or more portions of the prediction model based on the assessment.

A9. The method of any of embodiments A1-A8, further comprising: providing, subsequent to the one or more portions of the prediction model being updated, a data item to the prediction model to obtain a different version of the data item.

A10. The method of embodiment A9, wherein the data item comprises one of: a Magnetic Resonance Imaging ("MRI") image, an ultrasound image, and a Computed Tomography ("CT") scan image.

A11. The method of any of embodiments A1-A10, further comprising: obtaining a first noise image and a second noise image, wherein the first noise image comprises common noise data at a first location in the first noise image, and the second noise image comprises the common noise data at a second location in the second noise image, and wherein the input noise data is the first noise image or the second noise image, and wherein the one or more target output indications comprises information indicating one or more locations of the common noise data in the first noise image or the second noise image.

A12. The method of embodiment A11, further comprising: providing the first noise image and the second noise image to the prediction model to cause the prediction model to generate the related output, the related output comprising information indicating predicted locations of the common noise data in the first noise image and the second noise image, wherein the one or more portions of the prediction model are updated based on the predicted locations and the information indicated the one or more locations of the common noise data.

A13. The method of any of embodiments A1-A10, wherein the input noise data comprises an image comprising background noise data and correlated noise data, and wherein the one or more target output indications comprises information indicating a location of the correlated noise data in the image.

A14. The method of embodiment A13, further comprising: providing the image to the prediction model to cause the prediction model to generate the related output, the related output comprising information indicating a predicted location of the correlated noise data, and wherein the one or more portions of the prediction model are updated based on the predicted location and the information indicating the location of the correlated noise data.

B1. A method comprising: obtaining noise data and modified noise data, wherein the modified noise data comprise a modified version of the noise data; providing the modified noise data to a prediction model to obtain a reconstruction of the noise data; and providing the noise data to the prediction model as reference feedback to update one or more configurations of the prediction model, wherein the one or more configurations are updated based on the noise data and the reconstruction of the noise data.

B2. The method of embodiment B1, further comprising: providing, subsequent to the one or more configurations being updated, a data item to the prediction model to obtain a different version of the data item.

B3. The method of any of embodiments B1-B2, wherein the data item is a modified version of a given data item, and the different version of the data item is a reconstruction of the given data item.

B4. The method of any of embodiments B1-B2, wherein: the data item comprises a Magnetic Resonance Imaging ("MM") image that includes one or more aberrations; and the different version of the data item does not include the one or more aberrations in the MM image.

B5. The method of any of embodiment B4, wherein the one or more aberrations comprise at least one of: distortions to the MM image, vignetting to the MRI image, and chromatic aberrations.

B6. The method of any of embodiments B1-B2, wherein the data item comprises one of: a Magnetic Resonance Imaging ("MRI") image, an ultrasound image, and a Computed Tomography ("CT") scan image.

B7. The method of any of embodiments B1-B2, wherein the data item includes at least some aberrations, and the different version of the data item is a version of the data item having a reduction in the at least some aberrations.

B8. The method of any of embodiments B1-B7, wherein the modified noise data is obtained by: modifying the noise data to generate the modified noise data.

B9. The method of any of embodiments B1-B8, wherein the modified noise data is an output of a transformation of the noise data.

B10. A method comprising: obtaining a first noise image and a second noise image, the first noise image comprising common noise data at a first location in the first noise image, the second noise image comprising the common noise data at a second location in the second noise image, and the first location being different from the second location; providing the first noise image and the second noise image to a prediction model to obtain information indicating predicted locations of the common noise data in each of the first noise image and the second noise image; and providing one or more target output indications to the prediction model as reference feedback to update one or more configurations of the prediction model, the one or more configurations being updated based on the information indicating the predicted locations and the one or more target output indications, and the one or more target output indications comprising information indicating locations of the common noise data in each of the first noise image and the second noise image.

B11. The method of embodiment B10, further comprising: providing, subsequent to the one or more configurations being updated, a set of images to the prediction model, wherein each image of the set of images comprising common image data at a location different than a location of the common image data in at least one other image of the set of images; and obtaining information indicating predicted locations of the common image data in each image of the set of images.

B12. The method of any of embodiment B11, wherein each image of the set of images comprises the common image data and common background image data.

B13. The method of any of embodiments B10-B12, wherein obtaining the first noise image and the second noise image comprises: obtaining noise data; obtaining the common noise data; generating the first noise image based on the noise data and the common noise data by incorporating the common noise data as a foreground object at the first location over the noise data; and generating the second noise image based on the noise data and the common noise data by incorporating the common noise data as a foreground object at a random location over the noise data, wherein the random location is the second location in the second noise image.

B14. The method of any of embodiments B10-B13, wherein the first noise image and the second noise image comprise stereoscopic images.

B15. The method of any of embodiments B10-B14, wherein the first noise image and the second noise image each further include common noise background data with which the common noise data is overlaid, the method further comprises: obtaining a third noise image and a fourth noise image, the third noise image comprising the common background noise data and a first placeholder for the common noise data at the first location, and the fourth noise image including the common background noise data and a second placeholder for the common noise data at the second location; and providing the third noise image and the fourth noise image to the prediction model to update the one or more configurations, wherein the third noise image and the fourth noise image are used as labels indicative of the first location and the second location, respectively.

B16. A method comprising: obtaining an image comprising background noise data and correlated noise data; providing the image to a prediction model to obtain information indicating a predicted location of the correlated noise data; and providing one or more target output indications to the prediction model as reference feedback to update one or more configurations of the prediction model, the one or more configuration being updated based on the information indicating the predicted location and the one or more target output indications, and the one or more target output indications comprising information indicating a location of the correlated noise data in the image.

B17. The method of embodiment B16, further comprising: providing, subsequent to the one or more configurations being updated, a subsequent image to the prediction model to obtain information indicating a predicted location of correlated image data in the subsequent image.

B18. The method of any of embodiments B16-B17, further comprising: obtaining other images that each comprise (i) different background noise data than the background noise data of the image and (ii) different correlated noise data than the correlated noise data of the image; and providing the other images to the prediction model to obtain information indicating predicted locations of the different correlated noise data in the other images, wherein the one or more configuration of the prediction model are further updated based on the information indicating the predicted locations of the different correlated noise data.

B19. The method of any of embodiments B16-B18, wherein: the background noise data comprise noise data; and the correlated noise data comprise noise data having one or more aberrations causing correlations between image pixels of the correlated noise data.

B20. The method of any of embodiments B16-B19, further comprising: obtaining a reference image comprising the background noise data and a placeholder for the correlated noise data; and providing the reference image to the prediction model to update the one or more configurations.

B21. A tangible, non-transitory, machine-readable medium storing instructions that when executed by a data processing apparatus cause the data processing apparatus to perform operations comprising those of any of embodiments A1-A14 and B1-B20.

B22. A system, comprising: one or more processors; and memory storing instructions that when executed by the processors cause the processors to effectuate operations comprising those of any of embodiments A1-A14 and B1-B20.

What is claimed is:

1. A method for training a neural network, the method being implemented by one or more processors configured to execute one or more computer program instructions, the method comprising:

obtaining randomly generated noise data, obtaining common noise data;

generating a first noise image based on the randomly generated noise data and the common noise data by incorporating the common noise data as a foreground object at a first location over the randomly generated noise data;

generating a second noise image based on the randomly generated noise data and the common noise data by incorporating the common noise data as a foreground object at a second location over the randomly generated noise data, wherein the second location is a random location in the second noise image and different from the first location;

providing the first noise image and the second noise image to a neural network to obtain information indicating predicted locations of the common noise data in each of the first noise image and the second noise image; and providing one or more target output indications to the neural network as reference feedback to update one or more configurations of the neural network, the one or more configurations being updated based on the information indicating the predicted locations and the one or more target output indications, and the one or more target output indications comprising information indicating locations of the common noise data in each of the first noise image and the second noise image.

2. The method of claim 1, further comprising:

providing, subsequent to the one or more configurations being updated, a set of images to the neural network, wherein each image of the set of images comprising common image data at a location different than a location of the common image data in at least one other image of the set of images; and obtaining information indicating predicted locations of the common image data in each image of the set of images.

3. The method of claim 2, wherein each image of the set of images comprises the common image data and common background image data.

4. The method of claim 1, wherein the first noise image and the second noise image comprise stereoscopic images.

5. A method for training a neural network, the method being implemented by one or more processors configured to execute one or more computer program instructions, the method comprising:

obtaining an image comprising background noise data and correlated noise data;

providing the image to a neural network to obtain information indicating a predicted location of the correlated noise data;
providing one or more target output indications to the neural network as reference feedback to update one or more configurations of the neural network, the one or more configurations being updated based on the information indicating the predicted location and the one or more target output indications, and the one or more target output indications comprising information indicating a location of the correlated noise data in the image;
obtaining other images that each comprise (i) different background noise data than the background noise data of the image and (ii) different correlated noise data than the correlated noise data of the image; and
providing the other images to the neural network to obtain information indicating predicted locations of the different correlated noise data in the other images,
wherein the one or more configurations of the neural network are further updated based on the information indicating the predicted locations of the different correlated noise data.

6. The method of claim 5, further comprising:
providing, subsequent to the one or more configurations being updated, a subsequent image to the neural network to obtain information indicating a predicted location of correlated image data in the subsequent image.

7. The method of claim 5, wherein:
the background noise data comprise randomly generated noise data; and
the correlated noise data comprise noise data having one or more aberrations causing correlations between image pixels of the correlated noise data.

8. The method of claim 5, further comprising:
obtaining a reference image comprising the background noise data and a placeholder for the correlated noise data; and
providing the reference image to the neural network to update the one or more configurations.

9. A method being implemented by one or more processors configured to execute one or more computer program instructions, the method comprising:
obtaining a first noise image and a second noise image, the first noise image comprising common noise data at a first location in the first noise image, the second noise image comprising the common noise data at a second location in the second noise image, and the first location being different from the second location, wherein the first noise image and the second noise image each further include common background noise data with which the common noise data is overlaid;
providing the first noise image and the second noise image to a neural network to obtain information indicating predicted locations of the common noise data in each of the first noise image and the second noise image;
providing one or more target output indications to the neural network as reference feedback to update one or more configurations of the neural network, the one or more configurations being updated based on the information indicating the predicted locations and the one or more target output indications, and the one or more target output indications comprising information indicating locations of the common noise data in each of the first noise image and the second noise image;
obtaining a third noise image and a fourth noise image, the third noise image comprising the common background noise data and a first placeholder for the common noise data at the first location, and the fourth noise image including the common background noise data and a second placeholder for the common noise data at the second location; and
providing the third noise image and the fourth noise image to the neural network to update the one or more configurations, wherein the third noise image and the fourth noise image are used as labels indicative of the first location and the second location, respectively.

10. The method of claim 9, wherein the first noise image and the second noise image comprise stereoscopic images.

11. A non-transitory computer readable medium comprising instructions that, when executed by at least one processor, cause the at least one processor to:
obtain randomly generated noise data;
obtain common noise data;
generate a first noise image based on the randomly generated noise data and the common noise data by incorporating the common noise data as a foreground object at a first location over the randomly generated noise data;
generate a second noise image based on the randomly generated noise data and the common noise data by incorporating the common noise data as a foreground object at a second location over the randomly generated noise data, wherein the second location is a random location in the second noise image and different from the second location;
provide the first noise image and the second noise image to a neural network to obtain information indicating predicted locations of the common noise data in each of the first noise image and the second noise image; and
provide one or more target output indications to the neural network as reference feedback to update one or more configurations of the neural network, the one or more configurations being updated based on the information indicating the predicted locations and the one or more target output indications, and the one or more target output indications comprising information indicating locations of the common noise data in each of the first noise image and the second noise image.

12. The non-transitory computer readable medium of claim 11, wherein the instruction, when executed by the at least one processor, cause the at least one processor to:
provide, subsequent to the one or more configurations being updated, a set of images to the neural network, wherein each image of the set of images comprising common image data at a location different than a location of the common image data in at least one other image of the set of images; and
obtain information indicating predicted locations of the common image data in each image of the set of images.

13. The non-transitory computer readable medium of claim 12, wherein each image of the set of images comprises the common image data and common background image data.

14. The non-transitory computer readable medium of claim 11, wherein the first noise image and the second noise image comprise stereoscopic images.

15. A non-transitory computer readable medium comprising instructions for training a neural network that, when executed by at least one processor, cause the at least one processor to:

obtain an image comprising background noise data and correlated noise data;

provide the image to a neural network to obtain information indicating a predicted location of the correlated noise data;

provide one or more target output indications to the neural network as reference feedback to update one or more configurations of the neural network, the one or more configurations being updated based on the information indicating the predicted location and the one or more target output indications, and the one or more target output indications comprising information indicating a location of the correlated noise data in the image;

obtain other images that each comprise (i) different background noise data than the background noise data of the image and (ii) different correlated noise data than the correlated noise data of the image; and provide the other images to the neural network to obtain information indicating predicted locations of the different correlated noise data in the other images, wherein the one or more configurations of the neural network are further updated based on the information indicating the predicted locations of the different correlated noise data.

16. The non-transitory computer readable medium of claim 15, wherein the instructions, when executed by the at least one processor, cause the at least one processor to:

provide, subsequent to the one or more configurations being updated, a subsequent image to the neural network to obtain information indicating a predicted location of correlated image data in the subsequent image.

17. The non-transitory computer readable medium of claim 15, wherein:

the background noise data comprise randomly generated noise data; and the correlated noise data comprise noise data having one or more aberrations causing correlations between image pixels of the correlated noise data.

18. The non-transitory computer readable medium of claim 15, wherein the instructions, when executed by the at least one processor, cause the at least one processor to:

obtain a reference image comprising the background noise data and a placeholder for the correlated noise data; and provide the reference image to the neural network to update the one or more configurations.

19. A non-transitory computer readable medium comprising instructions that, when executed by at least one processor, cause the at least one processor to:

obtain a first noise image and a second noise image, the first noise image comprising common noise data at a first location in the first noise image, the second noise image comprising the common noise data at a second location in the second noise image, and the first location being different from the second location, wherein the first noise image and the second noise image each further include common background noise data with which the common noise data is overlaid;

provide the first noise image and the second noise image to a neural network to obtain information indicating predicted locations of the common noise data in each of the first noise image and the second noise image;

provide one or more target output indications to the neural network as reference feedback to update one or more configurations of the neural network, the one or more configurations being updated based on the information indicating the predicted locations and the one or more target output indications, and the one or more target output indications comprising information indicating locations of the common noise data in each of the first noise image and the second noise image;

obtain a third noise image and a fourth noise image, the third noise image comprising the common background noise data and a first placeholder for the common noise data at the first location, and the fourth noise image including the common background noise data and a second placeholder for the common noise data at the second location; and provide the third noise image and the fourth noise image to the neural network to update the one or more configurations, wherein the third noise image and the fourth noise image are used as labels indicative of the first location and the second location, respectively.

20. The non-transitory computer readable medium of claim 19, wherein the first noise image and the second noise image comprise stereoscopic images.

* * * * *